United States Patent [19]

Shahan et al.

[11] Patent Number: 4,777,613
[45] Date of Patent: Oct. 11, 1988

[54] FLOATING POINT NUMERIC DATA PROCESSOR

[75] Inventors: Van B. Shahan; Paul E. Harvey, both of Austin, Tex.; Clayton D. Huntsman, Brandon, Fla.; Ashok H. Someshway, Austin, Tex.

[73] Assignee: Motorola Inc., Schaumburg, Ill.

[21] Appl. No.: 847,064

[22] Filed: Apr. 1, 1986

[51] Int. Cl.⁴ .............................................. G06F 7/38
[52] U.S. Cl. .................................... 364/748; 364/200
[58] Field of Search ............... 364/715, 736, 748, 745, 364/200, 900

[56] References Cited

U.S. PATENT DOCUMENTS

| | | | |
|---|---|---|---|
| 3,976,869 | 8/1976 | Stella et al. | 364/730 X |
| 4,270,167 | 5/1981 | Koehler et al. | 364/200 |
| 4,348,722 | 9/1982 | Gunter et al. | 364/200 |
| 4,484,259 | 11/1984 | Palmer et al. | 364/754 |
| 4,509,116 | 4/1985 | Lackey et al. | 364/200 |

OTHER PUBLICATIONS

IEEE Standard for Binary Floating-Point Arithmetic, ANSI/IEEE, std 754–1985.
Volder, The CORDIC Trigonometric Computing Technique, IRE Trans. on Electronic Computers, Sep., 1959, pp. 330–334.
Walther, A Unified Algorithm for Elementary Functions, Spring Joint Computer Conference, 1971, pp. 379–385.
Meggitt, Pseudo Division and Pseudo Multiplication Processes, IBM Journal, Apr. 1962, pp. 210–226.

Primary Examiner—Gary V. Harkcom
Assistant Examiner—Tan V. Mai
Attorney, Agent, or Firm—John A. Fisher; Jeffrey Van Myers

[57] ABSTRACT

A numeric data processor having an execution unit adapted to efficiently execute the complete set of floating point operations recommended by the IEEE Standard for Binary Floating-Point Arithmetic, ANSI/IEEE Std. 754–1985, in full compliance therewith. The numeric data processor is also adapted to evaluate a large set of transcendental functions, including trigonometric, logarithmic and exponential, consistent with the IEEE Standard, without requiring a "software envelope." In the processor, special hybrid forms of Volder's CORDIC digital approximator and Meggitt's digital approximator are implemented in a manner so as to require minimal additions or modifications to the form of the execution unit which is otherwise required just to execute the standard floating point operations.

6 Claims, 4 Drawing Sheets

FLOATING POINT NUMERIC DATA PROCESSOR

TECHNICAL FIELD

This invention relates to numerical data processors, and, more particularly, to an execution unit for use in a floating point coprocessor.

BACKGROUND ART

In general, data processors implement floating point operations using subroutines constructed using only integer instructions and flow control instructions. In order to provide greater computing power for those applications requiring significant numbers of floating point operations, some data processors implement in hardware the essential floating point instructions, such as addition, subtraction, multiplication and division. Some even provide special floating point instructions such as square root.

Most commonly, these floating point instructions are directly integrated into the data processor. On the other hand, in some data processors the floating point instructions are provided in a separate numeric processor or "coprocessor" which cooperates with the main processor to execute the floating point instructions. Examples of this latter form of numeric processor are shown in U.S. Pat. Nos. 4,270,167 and 4,509,116.

In contrast to the basic floating point instructions, support for the transcendental functions, such as sine/cosine, logarithms and exponentials, is almost always provided using subroutines constructed using the integer and flow control instructions, and, if available, the floating point instructions. In at least one of the prior art numeric processors, the Intel 8087 shown in U.S. Pat. No. 4,509,116, instructions are provided to support restricted forms of certain of the transcendentals. However, in order to perform the other forms of these selected transcendentals, as well as the other transcendentals, a "software envelope" must be provided. No known numeric processor directly supports even a significant subset of the transcendental functions.

In view of the rapidly expanding requirement for floating point arithmetic in many fields, it is desirable that a numeric processor be provided which can directly support the *IEEE Standard for Binary Floating-Point Arithmetic*, ANSI/IEEE Std. 754-1985. It is also desirable that a numeric processor be provided which is able to support transcendental functions consistent with the IEEE Standard without a software envelope.

SUMMARY OF THE INVENTION

Accordingly, it is an object of the present invention to provide a numeric processor which can directly support the *IEEE Standard for Binary Floating-Point Arithmetic*, ANSI/IEEE Std. 754-1985.

Another object of the present invention to provide a numeric processor which can directly evaluate an extensive set of transcendental functions consistent with the *IEEE Standard for Binary Floating-Point Arithmetic*, ANSI/IEEE Std. 754-1985.

One other object of the present invention to provide a numeric processor having an execution unit which can efficiently evaluate an extensive set of transcendental functions, including trigonometric, exponential and logarithmic, consistent with the IEEE Standard without a software envelope.

These and other objects are achieved in a numeric data processor having an execution comprising: first, second, third, fourth, fifth and sixth data buses; a first switch for selectively coupling the first and second buses; a second switch for selectively coupling the first and fourth buses; sign logic coupled to the sixth bus and adapted to selectively latch a first operand sign and a second operand sign, and to provide a sign signal via the sixth bus indicative of the first operand sign, the second operand sign or the EXCLUSIVE OR of the first operand sign and the second operand sign; left and right shift temporary registers adapted to be selectively coupled to the first bus, with a barrel shifter coupled between therebetween and a barrel shifter decoder coupled to the barrel shifter and adapted to be selectively coupled to the third bus and to control shifts by the barrel shifter between the left and right shift temporary registers in response to shift counts received on the third bus; a first adapted to be selectively coupled to the second and fifth buses; a second working register adapted to be selectively coupled to the second and fourth buses; a third working register adapted to be selectively coupled to the second bus; a fourth working register adapted to be selectively coupled to the third bus and to a predetermined portion of the fourth bus; leading zero detect logic coupled to a predetermined high order portion of the third working register and adapted to be selectively coupled to the third bus, to detect the number of leading zeros in the high order portion of the third working register and to selectively provide a shift count indicative thereof to the barrel shifter decoder via the third bus; a multiplexor coupled to the first working register and to the second and fifth buses and adapted to selectively couple the fifth bus to either the second bus or to the first working register; an adder unit having a first input port coupled to the fourth bus and adapted to selectively complement an input recieved via the fourth bus, a second input port coupled to the fifth bus, and an output port coupled to the second bus, the adder unit being adapted to receive a carry in signal and to provide a carry out signal; a first counter adapted to be selectively coupled to a first portion of the second bus and to the third bus; a second counter adapted to be selectively coupled to a second portion of the second bus and to the third bus; sticky logic adapted to receive the carry out signal from the adder unit and to provide a sticky signal; and round (logic coupled to a predetermined low order portion of the first working register, to the sticky logic and to the sixth bus, and adapted to receive the sign signal from the sign logic via the sixth bus, the low order portion of the first working register and the sticky signal from the sticky logic, and to provide the carry in signal to the adder unit in response to selected logical combinations of the low order portion of the first working register, the sticky signal and the sign signal.

DESCRIPTION OF THE INVENTION

Figure 1:
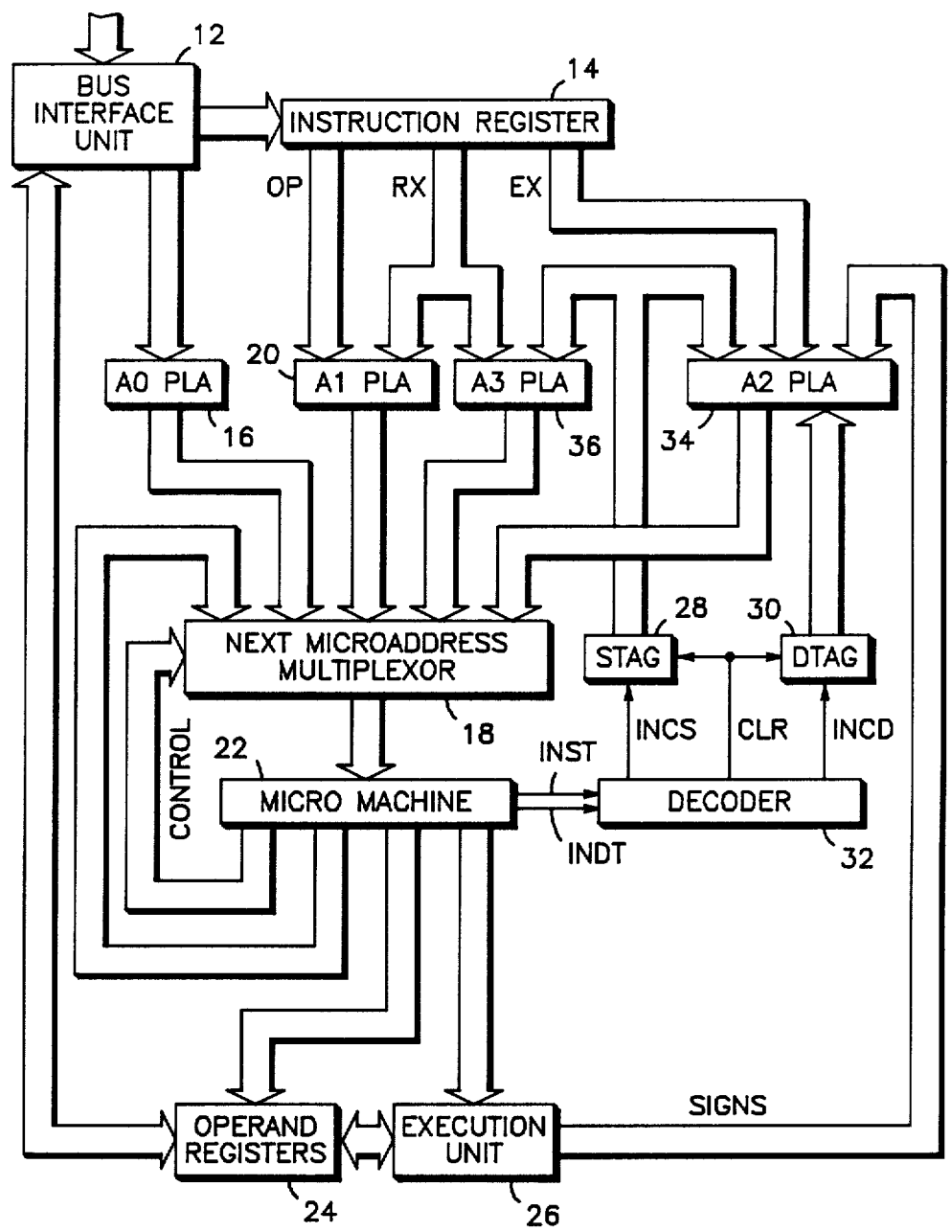
FIG. 1 is a block diagram of a numeric processor which utilizes the present invention.
Figure 2:
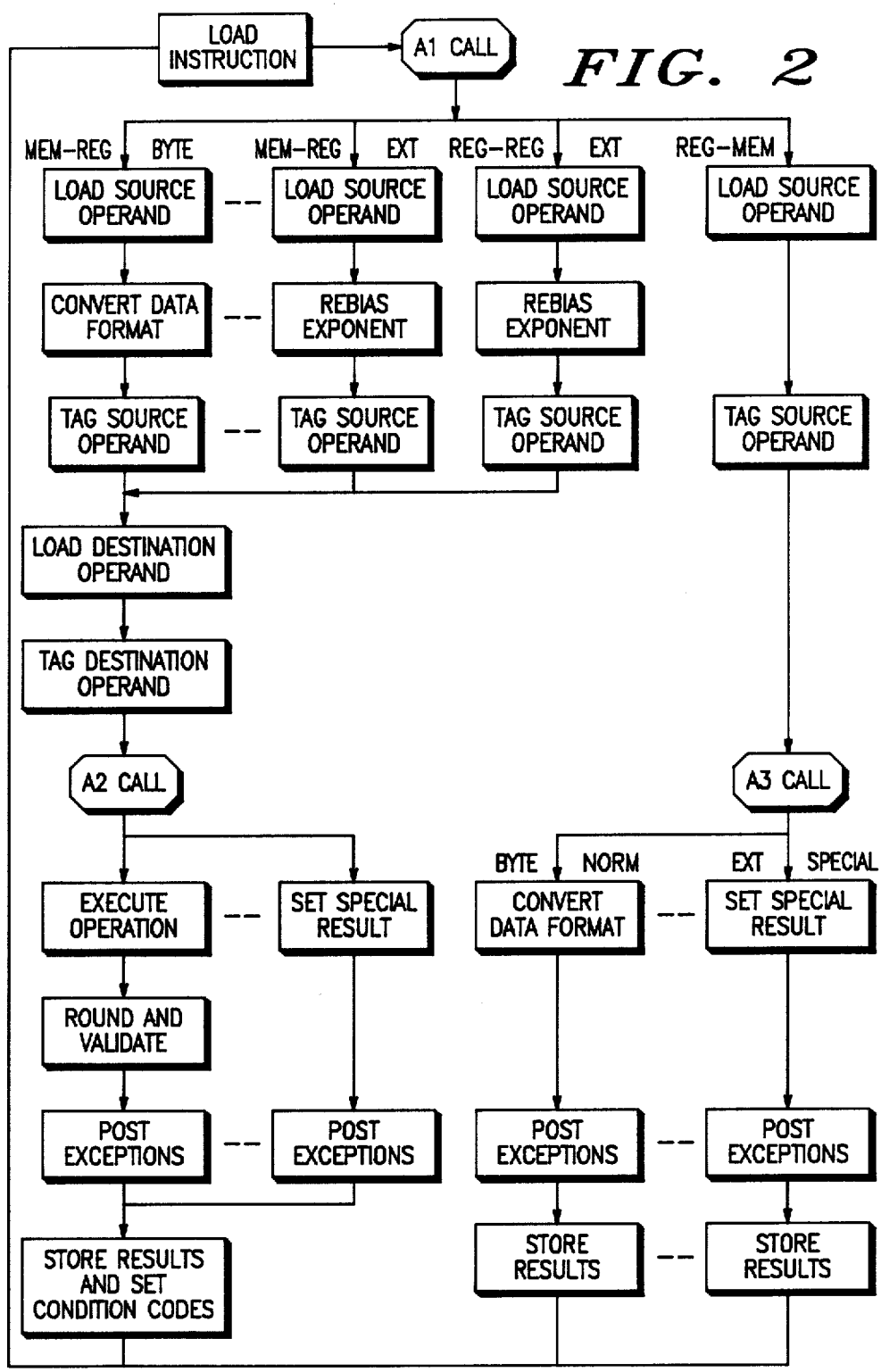
FIG. 2 is a flow diagram illustrating the instruction processing sequence of the numeric processor of FIG. 1.

Shown in FIG. 1 is a numeric processor 10 which is constructed in accordance with the preferred embodiment of the present invention. In operation, processor 10 executes instructions generally in accordance with the flow diagram shown in FIG. 2. Although processor 10 is capable of executing several different types of instructions, the present invention is primarily directed toward those instructions which specify any of a plurality of different numerical operations to be performed upon an operand which may have any of a plurality of different data formats. For the purposes of the present invention, such numerical operations may be either monadic (such as sin, arctan, square root, etc.) or dyadic (such as add, multiply, etc.); while the data formats may be different in length (such as byte, word, long word, etc). or form (such as integer, BCD, floating point, etc.).

Initially, a bus interface unit 12 loads each instruction to be executed by processor 10 into an instruction register 14. Although the bus interface unit 12 could be a bus controller such as that shown and described in U.S. Pat. No. 4,348,722, the preferred implementation is in the form of a coprocessor interface such as that shown and described in copending application (Ser. No. 485,672), Zolnowsky et al, filed Apr. 18, 1983 and assigned to the assignee of the present invention. In either form, the bus interface unit 12 initiates instruction execution by enabling a AO/ programmable logic array (PLA) 16 to provide to a next microaddress multiplexor 18 the microaddress of an execution initiation microsequence. Simultaneously, an A1 PLA 20 selects the microaddress of a preprocessing microsequence appropriate for the particular operation class (OP) of the instruction (i.e. memory-to-register, register-to-register or register-to-memory) and, if necessary, the data format of the source operand RX.

Assuming that micromachine 22 is initially idle, multiplexor 18 will be enabled to immediately forward the AO/ microaddress to the micromachine 22. In the preferred form, the execution initiation microsequence delays the micromachine 22 until the A1 PLA 20 has had time to resolve, before enabling multiplexor 18 to forward the A1 microaddress to micromachine 22.

If the class of the instruction is, for example, memory-to-register, the preprocessing microsequence called by the A1 PLA 20 will initially direct micromachine 22 to cooperate with the bus interface unet 12 in loading the source operand into one of several operand registers 24. The preprocessing microsequence will then enable micromachine 22 to control an execution unit 26 in a series of operand manipulation steps in order to convert the original source operand into an internal data format. This converted operand is preferably retained in a working register in execution unit 26 (see, generally, FIG. 4).

In the preferred form, the particular internal data format will be carefully chosen so as to be a "superset" of all of the available data formats. For example, assume that operands can be expressed as integers in lengths of one (1) byte, word, long word; as base 10 floating point numbers in packed binary coded decimal (BCD) form; or as base 2 floating point numbers in single, double or extended precision. Except for a few special cases, such as inaccuracies which inevitably occur in converting from base 10 floating point to base 2 floating point, an operand in any of these diverse formats can be converted into the base 2 extended precision floating point format without loss of either range or precision. Similarly, after the desired numerical operation has been performed, the result can be converted back into any of these formats while preserving as much range and precision as would have been possible if the operand had not been converted at all. In this example, the base 2 extended precision floating point format is the desired "superset" and is the preferred internal data format.

If the operand which is being loaded from memory is already in base 2 extended precision floaing point format, no format conversion as such is required. However, the exponent form used externally is typically biased by the hexidecimal value $3FFF, while the preferred form used within execution unit 26 is biased by $-1$ in order to facilitate two's complement manipulation. Accordingly, the preprocessing microsequence in the preferred form will direct micromachine 22 to step execution unit 26 through a brief series of manipulations which rebias the exponent of the operand in the working register. Similarly, if the class of instruction is register-to-register, the preprocessing microsequence will simply direct the micromahcine 22 to load an operand from the appropriate one of the operand registers 24 into execution unit 26 and then to step execution unit 26 through the exponent rebiasing sequence.

After the operand format conversion or exponent rebiasing is complete, the preprocessing microsequence directs micromachine 22 to "tag" the resultant operand as to data type. For the purposes of the present invention, the operand can be any of four (4) data types: normalized (NORM); zero (ZERO); infinity (INF); or "not-a-number" (NAN). For an extended precision floating point operand, the normalized data type includes: "normalized", i.e. having an exponent greater than or equal to the minimum possible exponent but less than the maximum possible exponent and a non-zero significand having a most significant bit (MSB) of one (1); "denormalized", i.e. having a minimum exponent and a non-zero significand having an (MSB) of zero (0); and "unnormalized", i.e. having an exponent greater than the minimum but less than the maximum and a non-zero significand having an MSB of zero (0). The ZERO data type, on the other hand, has an exponent equal to the minimum and an all-zero significand; while the INF data type has an exponent equal to the maximum and an all-zero fraction. Finally, the NAN data type has an exponent equal to the maximum and a non-zero fraction.

Figure 3:
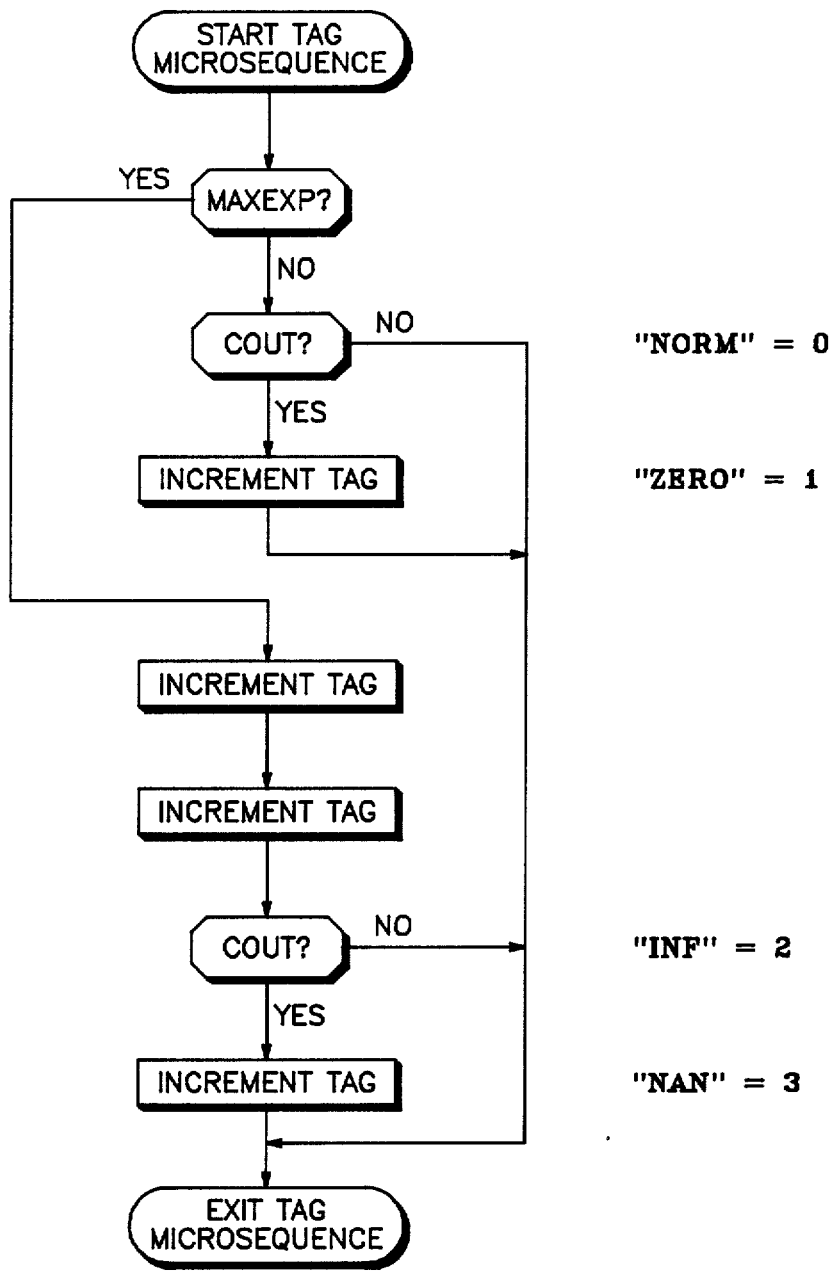
FIG. 3 is a flow diagram detailing the operand tagging sequence in the instruction processing sequence of FIG. 2.

As shown in FIG. 3, the tagging portion of the preprocessing microsequence initially enables micromachine 22 to clear a source operand tag (STAG) register 28 and a destination operand tage (DTAG) register 30 by simultaneously asserting both an "increment source tag" (INST) signal and an "increment destination tag" (INDT) signal to a decoder 32. The tagging microsequence then directs the micromachine 22 to enable execution unit 26 to compare the exponent of the operand to the maximum possible exponent. If execution unit 26 signals "not equal", micromachine 22 is then directed to enable execution unit 26 to determine if the significand of the operand is all zeros. One convenient way to perform this test is to complement the significand, add one (1) and watch for a carry out. If execution unit 26 signals "no carry out", the significand of the operand must be non-zero, and the tagging microsequence, having successfully determined that the operand is normalized, may exit leaving a value of "00" in STAG 28. On the other hand, if execution unit 26 signals "carry out", the significand must be zero, and the tagging microsequence will enable micromachine 22 to increment STAG 28 by asserting only INST to decoder 32, and then exiting leaving a value of "1" in STAG 28.

If the execution unit 26 signals that the exponent of the operand is "equal" to the maximum exponent, the tagging microsequence will enable micromachine 22 to increment STAG 28 by two (2) by twice asserting INST to decoder 32. Micromachine 22 is then direted to enable execution unit 26 to determine if the fraction portion of the significand is all zeros. As before, if execution unit 26 signals "carry out", the fraction must be zero, and the tagging microsequence, having determined that the operand is infinity, may exit leaving a value of "2" in STAG 28. If, on the other hand, execution unit 26 signals "no carry out", the fraction must be non-zero, and the tagging microsequence will enable micromachine 22 to increment STAG 28 by asserting INST once to decoder 32, and then exiting leaving a value of "3" in STAG 28.

Upon completion of the tagging of the source operand, the preprocessing microsequence enables micromachine 22 to load a destination operand (which may be meaningless if the selected operation is not dyadic) from the appropriate one of the operand registers 24 into a working register (not shown) in execution unit 26. The processing microsequence will again execute the tagging microsequence to "tag" the destination operand. This time, however, the tagging microsequence does not enable micromachine 22 to clear STAG 28 and DTAG 30, but simply proceeds to analyze the destination operand for data type. By the end of the tagging microsequence, the value in DTAG 30 will reflect the appropriate code as described above.

Upon completing the tagging of the destination operand, if any, the preprocessing microsequence directs micromachine 22 to enable an A2 PLA 34 to provide the microaddress of an operation execution microsequence which is appropriate for the particular numerical operation indicated in the extension (EX) portion of the instruction register 14. The preprocessing microsequence will then exit after directing micromachine 22 to enable multiplexor 18 to forward the A2 microaddress.

Often, when the operand(s) have one of the special data types (i.e. zero, infinity or NAN), the result of a particular numerical operation will be a default value (e.g. +zero, −infinity, etc.). In order to detect as early as possible such special cases as divide by zero, multiply by infinity or an operand which is a NAN, the operation execution microsequence selected by A2 PLA also depends upon the tag information in STAG 28 and DTAG 30. Assuming initially that the operand(s) are tagged as normalized, then the A2 PLA will provide the microaddress of the actual operation execution microsequence. Depending upon the selected numerical operation, the operation execution microsequence will enable micromachine 22 to control execution unit 26 in an appropriate series of steps to accomplish the operation. The operation execution microsequence will then direct micromachine 22 to post any exceptions encountered in performing the operation. In the preferred form, such exceptions include: overflow, underflow, inexact (rounded result), divide by zero, and invalid operation.

In contrast, assume now that the operand(s) are tagged as one of the special data types (i.e. zero, infinity or NAN). In this case, the A2 PLA will provide the microaddress of a special operation microsequence which, if appropriate, will simply direct micromachine 22 to store the default result in the destination operand register 24, before posting the corresponding exception if any. From just this aspect of the present invention, three very significant benefits are realized: the operation execution microsequences are relieved of the duty of detecting and handling special cases, thus allowing faster operation execution; all such special cases are handled very fast since no calculation need be done; and substantial microcode space is saved since these special operation microsequenes can be shared by all instructions.

After posting any exceptions, both the operation execution and special operation microsequences direct micromachine 22 to store the result which is still in a working register (not shown) in execution unit 26 back into a selected one of the operand resiters 24. The micromachine 22 will then be enabled to set the appropriate condition codes and log any posted exceptions into a status register (not shown) within bus interface until 12 for use by the user. Multiplexor 18 will then be enabled to forward the A0 microaddress if and when the next instruction is received for execution. In the preferred form, the clocks are also stopped to save power, and bus interface unit 12 will restart the clocks only when the next instruction has been loaded into instruction register 14.

If the instruction class is register-to-memory, indicating that a previously calculated result is to be stored into memory, the preprocessing microsequence called by the A1 PLA 20 will initially direct micromachine 22 to load a particular source operand from one of the several operand registers 24 into execution unit 26. The preprocessing microsequence will then direct micromachine 22 to perform the tagging microsequence to tag the source operand.

Upon completing the tagging of the source operand, the preprocessing microsequence directs micromachine 22 to enable an A3 PLA 36 to provide the microaddress of an operand conversion microsequence which is appropriate for the converting the source operand from the internal data format to the external data format indicated in the instruction. The preprocessing microsequence will then exit after directing micromachine 22 to enable multiplexor 18 to forward the A3 microaddress.

Depending upon the selected external data format, the operand conversion microsequence will then enable micromachine 22 to control execution unit 26 in a series of operand manipulation steps in order to convert from the internal data format into a selected one of the several external data formats. The operand conversion microsequence will then direct micromachine 22 to post any exceptions encountered in performing the operation. After posting any exceptions, the operand conversion microsequence directs micromachine 22 to cooperate with bus interface unit 12 to store the result which is still in a working register (not shown) in execution unit 26 into a selected location in external memory (not shown). The micromachine 22 will then be enabled to set the appropriate condition codes and log any posted exceptions into a status register (not shown) within bus interface unit 12 for use by the user. Multiplexor 18 will then be enabled to forward the A0 microaddress if and when the next instruction is received for execution. In the preferred form, the clocks are also stopped to save power, and bus interface unit 12 will restart the clocks only when the next instruction has been loaded into instruction register 14.

Figure 4:
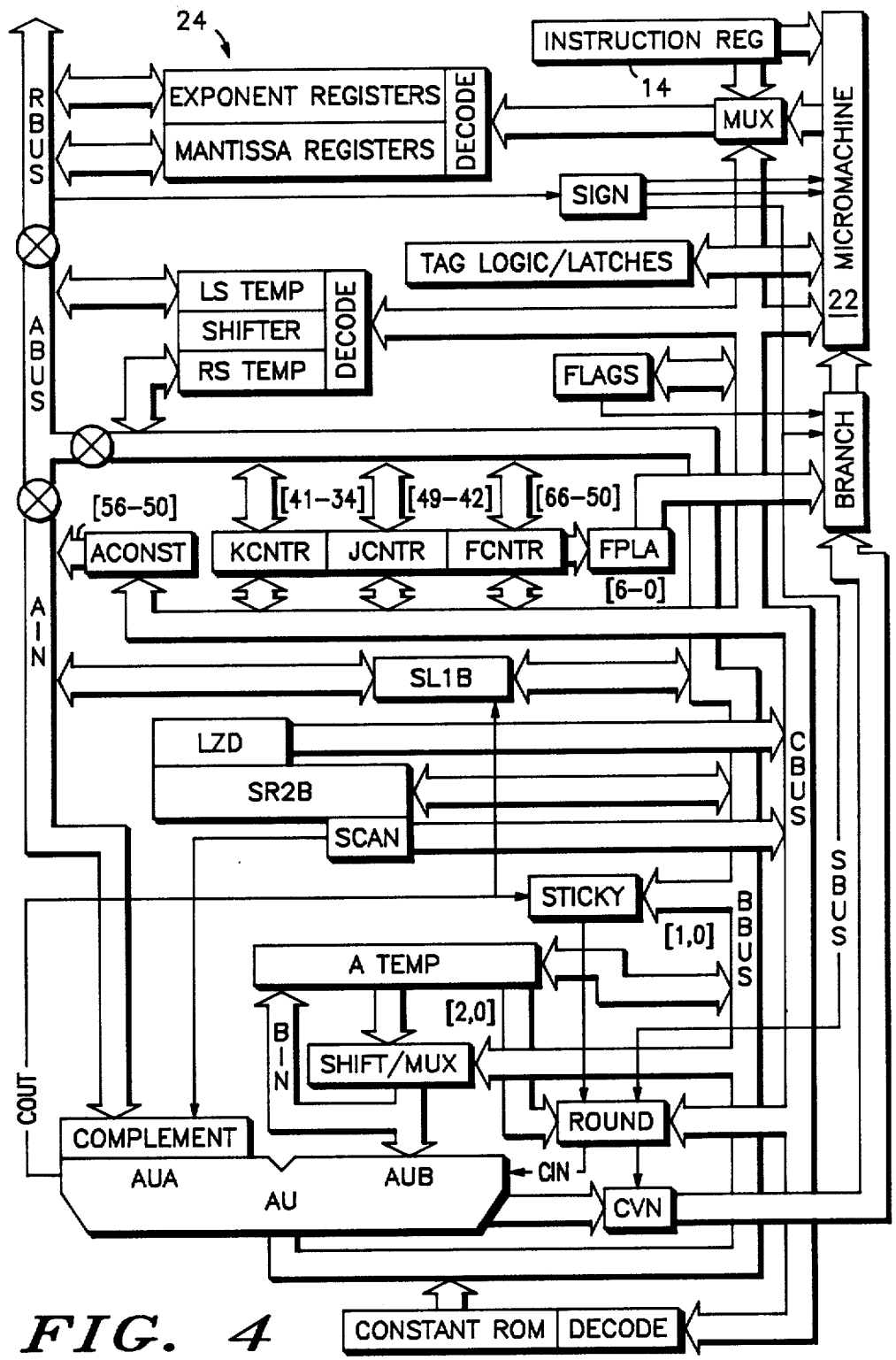
FIG. 4 is a block diagram of the execution unit of the numeric processor of FIG. 1.

In the preferred form shown in FIG. 4, the operand registers 24 consist of a set of eight (8) 80-bit floating point registers which are independently addressable by the user via the instruction register 14, and an additional four (4) 80-bit floating point registers which are addressable only by the micromachine 22. Each of the operand registers 24 is comprised of exponent and mantissa registers, independently accessible from the BIU 12 or the execution unit 26 via a 67-bit RBUS 38.

In general, execution unit 26 is comprised of the following components:

(A) A 67-bit BARREL SHIFTER and associated DECODER, for performing left or right shifts (logical) or right shifts (arithmetic) of 0–67 bits for the following functions:
  (1) Radix alignment in ADD and other functions, and m-bit shifts for transcendentals;
  (2) Fast normalize operation which is done at the end of the ADD routine and other flows; and
  (3) Packing and unpacking the various operand formats.

(B) A 67-bit Adder Unit (AU), which includes COMPLEMENT logic to selectively complement the operand input to the AUA port, a SHIFT/MUX which can select one of two input sources and then shift the selected operand before input to the AUB port:
  (1) Left by 1 bit for the restoring DIVISION and REMAINDER flows;
  (2) Left by 2 bits for the restoring SQUARE ROOT flow;
  (2) Right by 2 bits (arithmetic) for the MULTIPLY flow; or
  (4) 0 bits—for regular ADDs, SUBTRACTs, etc.; and
  a set of three (3) latches: C which latches the carry-out (COUT) of the AU, V which latches the msb of the result operand, and N which latches the (msb-1) of the result operand. The CVN latches feed a BRANCH multiplexor which exercises sequencing control over the micromachine 22. This single AU is used for both mantissa and exponent calculations, since a separate exponent alu would provide only a minimal increase in performance in most flows.

(C) Six (6) internal buses:
  (1) ABUS, a 67-bit data bus;
  (2) BBUS, a 67-bit data bus;
  (3) CBUS, an 8-bit address and data bus;
  (4) SBUS, a 1-bit sign bus;
  (5) AIN, a 67-bit data bus; and
  (6) BIN, a 67-bit data bus.

(D) Six (6) registers:
  (1) ATEMP, a 67-bit register used to latch the last input into the AUB port of the AU in the restoring divide, hyperbolic transcendental, and square root flows and as general purpose register;
  (2) SL1B, a 67-bit register which can sift left one bit (logical) per clock cycle, used to collect quotient bits in divide, result mantissa in square root and pseudo-quotient bits in transcendentals, and as a general purpose register;
  (3) SR2B, a 67-bit register which can shift right or left two bits per clock cycle, used with scan logic (SCAN) on the low order 3-bits in the multiply flow and leading zero detect logic (LZD) on the high order 48-bits for use during normalizing;
  (4) LSTEMP, a 67-bit register used to latch input data for left shifts through the BARREL SHIFTER and as a general purpose register;
  (5) RSTEMP, a 67-bit register used to latch input data for right shifts through the BARREL SHIFTER and as a general purpose register; and
  (6) ACONST, an 8-bit register aligned with AIN[57,50], which can be loaded with an immediate value from the micromachine 22 via CBUS, and then be driven onto AIN all in the same clock. Its main function is in decrementing or subtracting a constant from an exponent. For the normalize flow, ACONST is initially loaded with the shift count placed on CBUS by the LZD logic and then decremented by the amount the mantissa is shifted left.

(E) A CONSTANT ROM which holds: a table of powers of ten (10) for decimal to/from binary conversions; special exponent and mantissa values used to compare intermediate results against overflow and underflow thresholds (for single and double precision modes); unique shift constants that allow single, double, and extended precision flows to share the same subroutines; all constants to implement transcendental functions; and user visible constants such as pi, etc.

(F) Three (3) counters:
  (1) FCNTR, a 17-bit counter used primarily as an exponent register to feed an FCNTR PLA/comparator which during the tagging operation detects special exponent values. FCNTR PLA also detects overflow and underflow conditions, and forces the micromachine 22 to branch to the appropriate flow;
  (2) JCNTR, a 8-bit counter used to increment addresses used to access the CONSTANT ROM, set exceptions, and for general purpose data storage; and
  (3) KCNTR, a 8-bit counter used primarily as a loop control counter for such functions as multiply, divide, square root, the transcendentals, etc.

(G) ROUND logic consists of a small number of gates which enable the execution unit 26 to round, in conformance with the IEEE standard, an operand of the form:

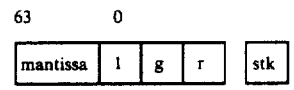

aligned in ATEMP as:

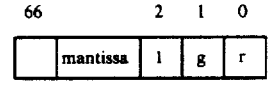

where:
l is the lsb of the mantissa;
g is the guard bit of the mantissa;
r is the round bit of the mantissa; and
stk is the sticky bit associated with the operand.
Depending upon the rounding mode selected by the micromachine 22, the ROUND logic sets the C latch if either g-bit, r-bit, or STICKY bit is set (i.e. the operand is inexact) and generates the carry-in (CIN) of the AU to round the mantissa up or not.

(H) SIGN logic consists of a single exclusive-or gate having separate latches (xora and xorb) on each input and a dynamic output on the SBUS. In general, the sign of each floating point number is stripped off into the input latches as the number is read into the execution unit 26. When the result is written back out to the operand registers 24, the result sign is overwritten in its proper place. The output of the exclusive-or gate (sign.flag) feeds the ROUND logic, the BRANCH mux for sequencing control, the condition code logic, and the status register for setting sign of quotient bits in remainder.

(I) Leading Zero Detect logic (LZD) operates in conjunction with SR2B to detect the total number of leading zeroes in the register, and to output to CBUS a value in each of two (2) successive 2-cycle "boxes", the sum of which is that total. With this arrangement, normalization of a number normally requires eight (8) cycles. However, during execution of an ADD instruction, the initial LZD scan can be performed during the last four (4) cycles of the ADD calculation itself, reducing the normalization time to only four (4) cycles.

(J) Several latches and FLAGS:

(1) A sticky bit latch (STICKY) assures that all floating point calculations can be calculated as if to infinite precision as mandated by the IEEE standard. This requires that all intermediate result bits less significant than the 66th bit be "ored" into STICKY. Rather than carry a unique sticky bit along with each intermediate result, STICKY is updated as required in the course of each flow to ensure a valid final result "sticky" at the end of the calculation before the round;

(2) FA, FB flags are general purpose flags for branching and are set from CBUS. They are used for special CONSTANT ROM addressing to collapse single, double, and extended precision flows into a single common flow to greatly reduce microcode. They are also used for addressing transcendental constants in the CONSTANT ROM;

(3) No-norm flag is a general purpose flag set from the "nor" of BBUS[65] and AIN[65]. It is used primarily for a quick indication of whether a given mantissa is normalized or not; and (4) The two 2-bit tag latches 28 and 30 are used as described above to tag the input operand(s) for a given instruction as a Norm, Zero, Infinity, or NaN.

(K) Some special purpose logic:

(1) Blocking logic. In order to conform to the IEEE standard which requires that the original operands in a given operation be preserved for use by the user's trap handler in a trapped exception environment, logic is provided to block the overwrite of the destination operand by the calculated result in the special case of exceptions occurring with the appropriate trap enabled. This relieves the microcode of determining this special case.

(2) Exponent bias circuitry. As each floating point number is input to the execution unit 26, the msb of the exponent is inverted to "bias" the exponent by −1. All arithmetic calculations and FCNTR PLA comparisons are done assuming this bias of −1. This inversion is reversed as the floating point number is output by the execution unit 26. Since there is no performance impact in exponent calculations with the −1 bias incorporated, this special hardware actually increases performance since the traditional unbiasing of the exponent would have required an extra two (2) cycles.

In the preferred form, the execution unit 26 operates at twice the speed of the operand registers 24, the CONSTANT ROM and the micromachine 22. In addition, the BARREL SHIFTER is pipe-lined, as is branching on processor conditions. Due to this mismatch of speeds, the efficient implemention of the transcendentals and other functions is not straight forward.

In general, ABUS, BBUS and AIN handle the data movement through the execution unit 26, while CBUS is used for addressing the working registers and the CONSTANT ROM, passing shift counts to the BARREL SHIFTER DECODER, and other functions. Additionally, SBUS is used to perform sign arithmetic, while BIN feeds the AUB port of the AU via the SHIFT/MUX, allowing very fast restoring division processes to be performed. ABUS is connected to AIN via one switch and to BBUS via another switch. Because of bus loading, the use of one switch excludes the closing of the other. Thus, data transfers from ABUS to AIN cannot be performed at the same time that ABUS to BBUS transfers are performed.

In the AU, both residual and explicit microcode controls allow the performance of both one's and two's complement arithmetic. Minimal additional residual control logic was provided to support the additions and substractions required by the transcendental equations.

The requirement of n-bit left shifts for IEEE floating point functions and right shifts (including arithmetic right shifts) for both IEEE and transcendental functions, indicated the need to incorporate a shifting device that would not be a detriment to performance. Thus, the BARREL SHIFTER is used to provide a zero to n-bit left shift, when the data is input via LSTEMP, and a zero to n-bit right shift, when the data is input via RSTEMP. The BARREL SHIFTER DECODER receives the shift count information via CBUS from the counters, from the LZD logic on SR2B, or from an immediate data field in the microcontrol word.

The three counters are used extensively to enhance the performance of both the IEEE and transcendental functions. The counters can read or write BBUS, and occupy separate bit positions on the upper half of the bus, so that the counters may be used as short temporary registers, when required. In addition, all counters can read or write CBUS.

FCNTR is generally used as a temporary for a floating point exponent. The transcendental functions rely on FCNTR to generate addresses which select ROM constants during the approximating sequences. FCNTR is an increment by one (1) counter. If written from CBUS, the most significant nine (9) bits are zeroed.

The transcendental flows utilize JCNTR and KCNTR primarily as shift count registers for the BARREL SHIFTER. Both are designed to cease incrementing if bit 6 and bit 2 are set. Both are increment by one (1) counters. Initializaton of JCNTR is done via CBUS from FCNTR during transcendental operations. If the value in FCNTR is greater than or equal to 127, JCNTR will be initialized to all ones (127) and will not subsequently increment.

The four (4) temporary operand registers 24 are accessed via ABUS. Use of these registers, however, is avoided as much as possible, since two (2) cycles are required to perform a read operation or a write operation with a temporary: In addition, two (2) accesses of the temporary must be made in order to obtain a floating point number: one for the mantissa and one for the exponent and sign. Because of this, all of the working registers in the execution unit 26 double as temporaries.

In general, LSTEMP is used to stage data to be left shifted, while RSTEMP holds data for future right shifting operations. Both can read or write their respective buses. Within the execution unit 26, SR2B and SL1B are algorithmic aids for most of the critical microcode loops. One performs two bit left shifts or arithmetic right shifts, while the other performs one bit left shifts. The special purpose of ATEMP is to provide storage for the partial remainder in restoring division-like processes. It can read BBUS or BINBUS and write BBUS or the SHIFT/MUX.

The constants required for argument reduction, function approximation, and user convenience (e.g. 1.0, pi, and e) are contained in the CONSTANT ROM that is accessed via BBUS and addressed via CBUS. (See, Tables C-1, C-2, C-3 and C-4 in Apendix C). The mantissa and exponent are obtained in separate accesses. No sign information is stored. The constants used for function approximation are 66 bits each, with ROM[65,0-]mapping onto BBUS[65,0] and BBUS[66] being forced to zero when the CONSTANT ROM is read. The addressing is such that, for a given approximating mode, if the address is invalid for the table being accessed, the data in the last element of the respective table is written onto BBUS.

The approximator constants are stored unnormalized by one bit position. This creates the room needed for accumulating a result during the pseudo multiplication process. Constants, used as arguments to IEEE floating point functions (argument reduction constants), are stored normalized, and thus, have 66 significant bits.

At the start of a floating point ADD or SUBTRACT instruction, the first argument's exponent is loaded into SL1B either from an external memory (not shown) or form a designated one of the operand registers 24 and the associated mantissa is loaded into RSTEMP, and the second argument's exponent is loaded into FCNTR from another one of the operand registers 24 and the associated mantissa is loaded into ATEMP. The exponent difference is then calculated by transferring FCNTR to the AUB port of the AU via BBUS while SL1B is transferred to the AUA port of the AUA via AIN and the COMPLEMENT logic. The AU output, i.e. the exponent difference, is then stored in FCNTR via BBUS.

The operand with the smallest magnitude is determined via the sign of the exponent difference and, if necessary, a mantissa compare using the AU. The smaller argument's mantissa is then loaded into RSTEMP. FCNTR is transferred to the BARREL SHIFTER DECODER via CBUS. The smaller argument's mantissa is then right shifted by the exponent difference to align the radix points, and stored in SL1B. The AU is then used to subtract the exponent difference from 67, and the result is loaded into KCNTR. KCNTR is again transferred to the BARREL SHIFTER DECODER via CBUS. The smaller argument's mantissa is then transferred from RSTEMP into LSTEMP and a left shift is performed to isolate the low order bits which will be lost due to radix alignment. These "sticky bits" are then transferred to the AU for a zero check to set STICKY accordingly. The aligned mantissas in SL1B and ATEMP are transferred to the AU for the ADD-/SUBTRACT, based on the EXCLUSIVE OR of the signs of the two arguments. The result of the ADD-/SUBTRACT is stored in both SR2B and LSTEMP.

In order to normalize the sum/difference, the LZD logic first transfers a "coarse" zero detect count (i.e. "0", "16", "32" or "48") to the BARREL SHIFTER DECODER via CBUS. After this first left shift, the partically normalized result is then transferred into LSTEMP via ABUS and into SR2B via BBUS. The LZD logic then transfers a "fine" zero detect count (i.e. "0", "1", . . . , "15") to the BARREL SHIFTER DECODER via CBUS. After this second left shift, the normalized sum/difference is then loaded into ATEMP via BBUS for rounding prior to being stored into the same operand register 24 which originally held the second argument.

The floating point MULTIPLY instruction is implemented utilizing a 2-bit overlapped scan technique commonly referred to as the modified Booth's algorithm. At the start of the MULTIPLY, the mantissa of the multiplier is loaded either from an external memory (not shown) or from a designated one of the operand registers 24 into SR2B and the associated exponent is loaded into FCNTR while the mantissa of the multiplicand is loaded from another of the operand registers 24 into RSTEMP and the associated exponent is loaded into SL1B. Since this is a looping algorithm, KCNTR is initialized and utilized as an incrementer with a rollover detection signal feeding the micromachine 22. Every iteration cycle, the following activity is initiated:

The SCAN logic scans the 3-bit pattern in SR2B[2-0]and transfers a shift count to the BARREL SHIFTER DECODER via CBUS. During the first iteration, while the SCAN logic is busy, the exponent of the result is calculated by transferring the exponent of the multiplier from FCNTR to the AUB port of the AU via BBUS and the exponent of the multiplicand from SL1B to the AUA port of the AU via AIN, and then transferring the resulting exponent back into FCNTR via BBUS. The next cycle, the result exponent in FCNTR is autoincremented to effect rebiasing. The SCAN logic also provides AU control information for the next cycle. After each scan, SR2B is shifted right 2-bits in preparation for the next scan. Simultaneously, the multiplicand in RSTEMP is shifted right by the BARREL SHIFTER by the shift count and the shifted multiplicand is transferred to the AUA port of the AU via ABUS and AIN. The first cycle, zero (0) is forced into the AUB port of the AU. At the end of each cycle, the AU output is transferred via BBUS into the SHIFT-/MUX for a 2-bit right shift arithmetic and back into the AUB port for the next cycle. KCNTR is then incremented and the process is repeated for 32 iterations. Each cycle, STICKY accumulates BBUS[1,0]. After the last cycle, the product is loaded into ATEMP from BBUS for rounding prior to being stored into the same operand register 24 which originally held the multiplicand.

The DIVIDE instruction is implemented using a classical restoring division algorithm. At the start of the DIVIDE, the mantissa of the divisor is loaded either from an external memory (not shown) or from a designated one of the operand registers 24 into RSTEMP and the associated exponent is loaded into SL1B, and the mantissa of the dividend is loaded from another of the operand registers 24 into ATEMP and the associated exponent is loaded into FCNTR. The exponent of the result is then calculated by first transferring the exponent of the dividend from FCNTR to the AUB port of the AU via BBUS and the exponent of the divisor from SL1B to the AUA port of the AU via AIN and the COMPLEMENT logic. The result is then transferred back into the AUB port of the AU via BBUS and a one (1) is forced into the AUA port of the AU via AI and the COMPLEMENT logic, and the rebiased exponent transferred back into FCNTR via BBUS. As in MULTIPLY, KCNTR is initialized and utilized for iteration count control. Every cycle, the following control is initated:

RSTEMP is transferred to the AUA port of the AU via ABUS, AIN and the COMPLEMENT logic in preparation for a subtraction. In the first cycle, ATEMP is transferred via the SHIFT/MUX with a 1-bit left shift into the AUB port of the AU. The carry out (COUT) of each subtract operation represents one quotient bit, and each is accumulated by being left shifted into SL1B[0]. COUT also residually selects the AUB input for the next iteration. If COUT=0, the previous AUB input in ATEMP is reused. If COUT=1, the AU output on BBUS is routed to the AUB port. In either case, the SHIFT/MUX performs a 1-bit left shift before the selected input is presented to AUB, and a copy of the shifted input is stored in ATEMP via BIN in preparation for the next cycle. KCNTR is incremented and the process is repeated for 66 iterations. After the last cycle, the quotient in SL1B is rounded prior to being stored into the same operand register 24 which originally held the dividend.

The SQUARE ROOT instruction is implemented with a classical restoring algorithm. At the start of the SQUARE ROOT, the mantissa of the operand is loaded either from an external memory (not shown) or from a designated one of the operand registers 24 into LSTEMP and the associated exponent is loaded into FCNTR. FCNTR is written to CBUS to load the least significant bit into the FLAGS for branching. If the exponent is even, the mantissa in LSTEMP is shifted left 1-bit and stored into SR2B via BBUS. If the mantissa is odd, the mantissa is transferred to SR2B with no shift. The result exponent is calculated by performing an arithmetic right shift of 1-bit on FCNTR utilizing the SHIFT/MUX with a 2-bit right shift and then a 1-bit left shift. KCNTR is initialized and utilized for iteration count control. ATEMP and SL1B are cleared. Every cycle, the following control is initiated:

SL1B is transferred to the AUA port of the AU via AIN and the COMPLEMENT logic. In the first cycle, ATEMP is transferred into the AUB port of the AU via the SHIFT/MUX with a 2-bit left shift and the two most significant bits of the operand in SR2B are routed to the vacated bit positions. The CIN into the AU is forced to 0 always. The COUT of each AU operation represents one result bit, and each is accumulated by being left shifted into SL1B[2]. COUT also residually selects the AUB input for the next iteration. If COUT=0, the previous AUB input in ATEMP is reused. If COUT=1, the AU output on BBUS is routed to the AUB port. In either case, the SHIFT/MUX performs a 2-bit left shift before the selected input is presented to AUB, and a copy of the shifted input, with the 2-bits from SR2B inserted, is stored in ATEMP via BIN in preparation for the next cycle. Also in each cycle, SR2B is left shifted by 2-bits and the most significant two bits are routed into the two least significant bit positions vacated by the 2-bit left shift of the SHIFT/MUX at the AUB input port of the AU. KCNTR is incremented and the process is repeated for 65 iterations. After the last cycle, the result mantissa is transferrred from SL1B to ATEMP for rounding prior to being stored in the designated operand register 24.

In addition to the standard floating point operations described above, processor 10 also implements many transcendental functions, each fully in compliance with the *IEEE Standard for Floating-Point Arithmetic*, ANSI/IEEE Std. 754–1985. In addition to being highly microcode efficient, the microcode flows for these functions required very minimal additional hardware in the EXECUTION unit 26, except for an expansion of the CONSTANT ROM to accommodate the necessary constants. However, in order to efficiently perform such diverse operations as the trigonometric functions, exponentials and logarithms, a unified set of algorithms had to be devised which departed in certain key areas from prior art techniques.

Most methods for computing trigonometric or transcendental functions by machine are not complete in themselves; they only perform the calculation over some small interval of the total domain of the function and, thus, rely on special identities (argument reduction procedures) to reduce an argument to one that is manageable by the method. Thus, a given approximator for the sine(x) function may only produce the sine(x) for $0 < = x < (2*pi)$. This means that an argument reduction procedure must be found which not only reduces the input argument to within the range of the approximator, but also allows the completion of the computaton of the function. Sometimes a set of identities is required in order to allow the function to be calculated over its domain.

To assist the example approximator above, the following two identities might be recognized:

$$\text{sine } (|x|) = \text{Sine } (R, \text{ where } R = x \text{ mod } (2*pi) \qquad (1)$$

$$\text{sine } (-x) = -\text{sine } (x) \qquad (2)$$

The first identity says that the remainder, produced by dividing the argument by two pi, can be used to calculate the sine of the absolute value of the argument.

This identity allows the magnitude of the input argument to be reduced within the range of the approximator, but does not allow sines to be calculated for negative x. Fortunately, inference from the second identity indicates that if a sine of the absolute value of the remainder is calculated and the argument is negative, obtaining the correct result only requires complementing the result returned by the approximator.

Of course, this is a hypothetical example. Even for periodic functions, such as sine and cosine, it may not even be possible to find an approximator that will operate over the domain of one period and still have good numerical behavior. Nevertheless, the problem of argument reduction and application of the approximator remains the same and leads to the following general technique, by which, the trigonometric and transcendental functions are implemented in processor 10:

(1) The function argument is reduced to one of appropriate size by applying a known argument reduction procedure;

(2) The reduced argument is evaluated using the correct approximating method; and (3) The approximated result is combined with the rest of the argument reduction procedure to provide the final result.

The digit-by-digit techniques used in processor 10 involve four computational modes. Each of the modes provides primitive functions from which a variety of other functions can be generated. The functions created from each of the modes are shown in FIG. A-1 of Appendix A. How these modes were developed and how each operates is the subject of the following pages. After the approximators are developed, considerable attention will be given to functions provided in processor 10 and to the argument reduction procedures and other identities that allow the functions to return the correct result over their entire domain of input arguments.

The COordinate Rotation DIgital Computer, invented by Jack E. Volder ("The CORDIC Trigonometric Computing Technique," IRE Transactions on Electronic Computers, Vol. EC-8, No. 3, pp. 330–334, September 1959) and later generalized by J. S. Walther ("A Unified Algorithm for Elementary Functions," Spring Joint Computer Conference, 1971, pp. 379–385), is one of several digit-by-digit techniques suitable for high performance function approximations in a VLSI numerical processor. In general, the CORDIC method involves the execution of the iteration equations shown in FIG. A-2 of Appendix A for a sufficient number of iterations to guarantee satisfactory precision of the result. These equations were derived from relationships observed as a vector is rotated through a circular or hyperbolic plane. Using limit theory, the technique can also be extended to rotations in a linear system to provide multiplication and division operations. The desired functions are created by driving either the Z term or the Y term to zero in a fashion similar to that of non-restoring division. Overshoot or undershoot of the zero positon just causes the signs of the operators of the iteration equations to switch, until another pass through zero is achieved. Be design the amount of over/undershoot is less each time, so that by the end of the n-th iteration, the control term (Z or Y) is within one bit of the machine's finite representation of zero.

Elimination of the Z term constitutes the rotation of a given radian angle argument by a set of predetermined smaller angles. (See, Table C-1 in the Appendix.) At each rotational step a new X and Y coordinate is calculated for the approximated angle in a "unit environment". Thus, with proper initial value choices, the rotation causes the calculation of a sine (Y equation) and cosine (X equation) in a unit circle, while in a unit hyperbola, the sinh and cosh are created.

Driving the Y term to zero has the reverse effect. The point, whose coordinates are specified by X and Y, is driven towards the x-axis. At each step the angular increment that describes the movement is accumulated by the Z equation. This causes the Z equation to converge to the arc tangent of the input argument in a circular system or the hyperbolic arc tangent in the hyperbolic coordinate system. Simultaneously, the X term approaches the radius of the vector described by the given point (X,Y), according to the definition of the radius of the plane. Operating the CORDIC equations in this "reverse" fashion is called vectoring.

In these equations, M parameterizes the coordinate system and is either $-1, +1$, or 0. $M = -1$ is used for the hyperbolic system, while $M = 1$ is used for circular functions. $M = 0$ for the linear functions was not implemented in processor 10, since it was possible to use faster means for the multiply and divide operations provided by those modes.

To maintain performance, as well as to allow the iteration equations to use only shift and add/subtract operations, the set of iterating steps ignores error that is generated by a deviation in the length of the vector as it is rotated. It is a function of the number of iterations performed and the starting iteration ($K = f(n,i)$) and is independent of the sequence of arithmetic operations performed. The error is multiplicative from iteration to iteration and, therefore, can be eliminated by assigning the registers initial values which have been multiplied by the reciprocal of K (K Inverse). (See, FIG. A-3 in Appendix A.) Thus, the error will cancel during the course of executing the process, and since the initial register values are known before hand, they may be loaded from the CONSTANT ROM. No actual multiplication need occur.

The derivations shown in FIGS. A-4, A-5, A-6 and A-7 of Appendix A include those extractions from the general solution for CORDIC to show X, Y, and Z final (as applicable) for the four modes of operation. Because indirect computation of exponentials and logarithms created a performance penalty, and because extra hardware would have been requried to guarantee that the algorithm will converge to the correct functional value, the $M = -1$ modes were removed and another method, discussed later, was chosen for those functions.

In general, the iteration equations are iterated until a sufficient resulting precision is obtained. Consideration given to the accumulation of truncation errors shows that the worst case error requires (L+log [base 2] L) bits of storage to produce a result precise to L bits. The 67-bit internal register and bus width of processor 10 did not allow calculation to extended precision, and for that reason, the transcendentals are correct only to double precision.

To maintain normalization of the result in the Y register for small input argument values, the scaling identities presented by Walther were applied to generate the iteration equations given in FIG. A-8 of Appendix A. As a consequence, the table of inverse K factors in Table C-2 of Appendix C was required. Fortunately, the K inverses converge towards unity at a sufficient rate that only N/2 (where N is the register precision) entries were required. Additionally, the prescaling identities require the maintenance of additional shift count information, which is kept in KCNTR.

The CORDIC method, while providing rapid computation of the exponential function (via etox($x$)=sinh($x$)+cosh($x$)), is more difficult for logarithms. Using CORDIC, logarithms must be created using the hyperbolic arc tangent primitive. The argument reduction procedure for the hyperbolic arc tangent function is very lengthy and an additional argument reduction procedure has to be used for the finalization of the logarithm. (See, FIG. A-9 of Appendix A.) Thus, an alternate approach was sought that was based upon a digit-by-digit technique similar to CORDIC. J. E. Meggitt ("Pseudo Division and Pseudo Multiplication Processes," IBM Journal, pp 210–226, April 1962) presented a method based on Brigg's technique for the calculation of logarithms. The idea was to perform a division-like process in order to calculate "quotient digits," which in turn could be used to control a multiplication-like process in order to provide the desired function.

For logarithms, the quotient digits are chosen to satisfy Equation 17 in FIG. A-10 of Appendix A. As can be seen in the derivation in FIG. A-11, the quotient digits can be used to control the summation of a set of stored constants to achieve a logarithmic function. This is in effect a pseudo multiplication. In FIG. A-12 of Appendix A is the derivation of the iteration equations which are performed to determine the j-th pseudo quotient digit in the calculation of the log $(1+y/x)$.

The derivation in FIG. A-13 of the Appendix shows how to maintain normalization for the Y term in Meggitt's method. This is basically Walther's technique used for CORDIC. Care must be used with the choice of the initial X in this prescaling method to prevent a register overflow condition from occurring. In this derivation assume the addition of a "Z" equation which accumulates a result according to Equation 18 in FIG. A-14 of the Appendix. Thus, after the prescaling identities have been applied, the iteration equation set is as given in FIG. A-15 of the Appendix. The Y equation is driven towards zero, constituting elimination of the pseudo partial remainder in the division process. The division behaves as a restoring division according to the pseudo quotient information generated by the arithmetic operations in the previous iteration.

Just as was done in the CORDIC method, the technique can be applied in "reverse" to create an exponential function. Conceptually, it is desired to divide an argument by a set of previously stored elemental parts. A Q digit is used to indicate the number of these elemental units. Thus, this pseudo division is performed to provide Q digits in such a way as to satisfy Equation 19 in FIG. A-16 of the Appendix. Once the Q digits have been acquired, the calculation of the right hand side of Equation 21 in FIG. A-16 of the Appendix remains to be performed. According to Meggitt, the solution to this problem is to assume that Equation 22 in FIG. A-16 of the Appendix has already been calculated, and to attempt accumulation of the next factor of $(1\ 30\ B^{-j})$. With the definitions given in Equations 24 and 25 in FIG. A-17 of the Appendix, the iteration equations 26 and 27 in FIG. A-17 of the Appendix for the j-th digit of the result can be determined. The prescaling operations are then performed and the complete set of equations generated is given in FIG. A-18 of the Appendix.

Notice that in this process the Z equation is driven to zero, just like the CORDIC rotational modes. Since radix two is chosen, $\max(a) = \max(Q) = 1$, and therefore only one factor of $(1 + B^{-j})$ need be tried for each iteration of the loop. If the factor is too large, the pseudo remainder is restored and the next smaller factor is tried. Similarly, one Q digit of value zero or one is established for each iteration, and therefore, the pseudo-multiply need only execute one iteraton for each Q.

The stored constants required for this method converge to unity (within the precision of the machine) more slowly than the convergence of the arc tangent constants required for the CORDIC modes. (See, Table C-3 in the Appendix.) However, since a table of inverse K's was not required, the ROM storage ended up being equivalent in size. There are N entries where N is the number of bits of intended storage.

The prescaling caused no additional hardware to be added, since it was already required for use by the CORDIC modes. The AU control modifications for the X-Y loops were minimal (two exclusive-OR gates were used), because certain restoring division processes were to be implemented to satisfy requirements for the IEEE arithmetic.

If CORDIC had been used for the hyperbolic modes, some of the iterations of the iteration equations would have had to be repeated to satisfy convergence criteria. However, Meggitt's Method requires no iteration to be repeated and thus provides a faster approximation, requires less control logic for hyperbolics and allows less complex argument reduction procedures to be used to generate the logarithmic and exponential functions.

Recall that the approximating methods discussed above are fixed point operations. The CORDIC method imposes an additional requirement that the numbers be two's complement, so that signed operations can also be executed. Both techniques assume that an exponent of the radix to the zero power (i.e. an exponent of one) accompanies the fixed point portion of the number, although its presence is implied. The effect of Walther's prescaling technique is to attach different implied exponents to some of the registers. Since the occurrence of leading zeroes indicates a loss of precision, it is desirable to keep the numbers in the registers normalized (the most significant 'one' bit as far to the left as possible) for the duration of the calculation. This is the power of the prescaling technique.

For CORDIC the benefits of prescaling can be seen as the argument to the approximator becomes smaller. With the correct initial values, the X register yields a cosine of the input argument, while the Y register yields the sine (in mode 1, the Z register is reduced to zero). Limit theory indicates that, as the input angle decreases in magnitude, the sine will approach the input argument and the cosine will near unity. If the implicit exponents were two to the zero, the cosine would not suffer from any precision loss, but some (and eventually all) of the sine information would be truncated to make room for leading zeroes. Thus, the choices for implied exponents would be two to the zero for the X register, and the argument's exponent for the Y register. The independent variable of the function should be in floating point format, so the implied exponent of the Z register is desired to be that of the exponent field of the floating point number.

Examination of the rotation and vectoring processes shows how the leading zeroes are generated. The CORDIC method does not consider the magnitude of the input argument, other than to guarantee that the summation of the set of angles can be made at least as big. Thus, a relatively large starting angle is used in an attempt to reduce the input argument to zero (for rotation). If the input angle is relatively small, when compared to this initial rotation, the overshoot is large, and many bits must be accumulated to represent the 'miss'. If a sufficiently small starting angle were to be used, the overrotation would be smaller and fewer bits would be required to handle the miss. This is reflected in the X and Y equations as a more normalized result, because they will also deviate slightly from their desired result. Any leading zeroes can be inferred from the implied exponent. Thus, it is desirable that the initial angle of rotation be chosen to be of the same order as the function argument.

For the CORDIC method to work correctly, the convergence criteria given in FIG. A-19 of the Appendix must be satisfied. The magnitude of the initial angle of rotation is, therefore, arbitrary. The initial shift count is a function of the current angle of rotation, being its tangent. For convenience and simplicity of implementation, the next consecutive angle constant is then extracted from the table, and the next consecutive shift count is utilized (allowing a counter to be used for this purpose).

By making the substitutions given in FIG. A-8 of the Appendix, the prescaled difference equations are realized. The implied exponent of X is two to the zero, while Y and Z have two to the power of the exponent of the input argument. The angles shown in Table C-1 of the Appendix are stored with an implied exponent of two to the negation of their correspondig shift counts. This causes the angles to reside nearly normalized in the CONSTANT ROM.

Since the first angle of rotation is chosen to be of the same order as the function's input, it is convenient to have the first element of the shift sequence be the absolute value of the argument's exponent. This results in the prescaled CORDIC method having two initial shift amounts: $(f-e)=0$ and $(f+e)=2e$. These shift counts are referred to as the K and J counts, respectively, and the final iteration equations appear as those in FIG. A-8 of the Appendix.

Of course, all of the arguments for rotation apply to the vectoring CORDIC mode (mode 2). If the initial Y is small, there is no need accumulating the arc tangents of the initial shifts, since they will only cancel in the final result. Thus, the choice of larger initial shift counts, implies the accumulation of a smaller arc tangent, and thus, a smaller deviation from normalization in the result. These facts lead to the same choices for implied exponents and, thus, result in identical difference equations, only operated in 'reverse'.

The problems associated with small arguments also occur in Meggitt's method. As the input to the approximator is reduced in magnitude, it is not necessary to attempt the initial choices for factors of $(1+B^{-j})$ as they will be too large. The use of the larger factors even for small input arguments introduces leading zeros, thereby causing precision loss unless additional bits of storage are provided.

However, it was perceived by Clayton D. Huntsman, an inventor hereof, that Walther's prescaling method can be applied to Meggitt's method to maintain precision throughout the entire range of input arguments. The prescaled logarithm constants required to implement this method are given in Table C-3 in the Appendix.

For convenience, the flows executed by the micromachine 22 to perform each of the transcendental functions will be represented by "pseudo code" routines. The syntax used in these pseudo code routines is described in Section B of the Appendix. Associated with each pseudo code routine is the relevant argument reduction procedure, if any. As each function is described below, reference will be made to the pertinent FIG. in the Appendix.

In the iteration equations shown in FIGS. A-15 and A-18 of the Appendix, two processes exist, one for pseudo division and one for pseudo multiplication. In each, the X and Y equations constitute one process and use only shift, add and subtract operations. The Z equation employs a ROM constant lookup, as well as a shift and add/subtract operation. Thus, if shift and add operations are fast relative to CONSTANT ROM access times, the performance of the loop can be improved by performing the algorithm in two separate steps or loops, i.e. calculating the next X and Y, taking advantage of the high speed shifts and adds, and then generating the next Z.

In order to successfully segregate portions of the iterating sequence, the quotient bits must be accumulated in such a manner as to allow the bits to be re-used for controlling AU operations during the second half of the procedure. The process of bit accumulation is most conveniently performed by shifting the quotient bit information, created by the correct control equation (Z or Y), into an accumulating register. Since SL1B is used to collect quotient bits for the divide, square root, and both remainder operations, it was chosen to collect the pseudo quotient bits generated during the execution of the flow. However, a modification to the register must be made so that the most significant bit could be sent to the AU control circuitry to control the second phase of the method. Thus, the quotient bits are collected and dispensed in a first-in, first-out manner.

In an effort to realize similar benefits for the CORDIC method, Mr. Huntsman carefully analyzed the CORDIC iteration equations shown in FIG. A-8 of the Appendix and discovered that they could be rewritten in the form shown in FIG. A-19 of the Appendix. In this new form, the CORDIC iteration equations can also be evaluated using a two loop process which is very similar to Meggitt's. As a result of this, the same execution unit can be used to approximate transcendental functions using the heretofore incompatible digital approximation techniques: CORDIC with Walther's prescaling, or Meggitt's. The price paid for this great increase of capability is only a very slight increase in hardware over what would have been required to implement either alone.

The relationship between the IEEE number format, internal to processor 10, and the format of the numbers used by the approximators is shown in FIG. B-1 of the Appendix. The bit positions shown are those occupied on the internal buses. Converting a result back into IEEE format requires that the answer be normalized. The concept of normalization of numbers, internal to the machine, is that of maintaining a 'one' in the explicit one position of the word, as opposed to maintaining a 'one' in the most significant bit position. Additionally, conversion to IEEE format requires that the mantissa be on unsigned quantity. Since transcendental answers may be negative numbers, the result must be complement and the sign information must be adjusted to reflect the sense of the number. The exponent of the answer is, of course, known before the approximator is called, and may be established at any time in the location desired for the result to complete the conversion process.

The methodology for performing the approximations using the two loop technique shown in "pseudo-code" in FIG. B-2 of the Appendix. The general form of the approximators in processor 10 is shown in pseudo code form in FIGS. B-3, B-4, B-5 and B-6 of the Appendix. The mode 1 approximator is used for part of the computation of sin(x), cos(x), tan(x), and sincos(x). The mode 2 approximator is used for part of the computation of atan(x), asin(x), and acos(x). The mode 3 approximator is used for a portion of the computation of etox(x), etoxml(x), cosh(x), sinh(x), and tanh(x). The mode 4 approximator is used for a portion of the logn(x), lognpl(x), and atanh(x) functions.

For many applications the speed at which a function can be calculated will be a more important consideration than the degree of precision contained in the result. Changing the precision of a CORDIC calculation for enhanced execution performance requires the following conditions to be satisfied:

(1) The number of iterations executed must be modified so as to reduce the total number of iterations in the calculation. This produces fewer significant bits;

(2) Since fewer pseudo quotient bits are generated, use of the two loop method requires 'normalization' of these bits in the SL1B register;

(3) Provision must be made for an additional table of error correctng constants to account for the error in the reduced number of iterations; and (4) Rounding and validation of the result must be performed in single precision.

Since there are no error constants in Meggitt's method, conditions (1), (2) and (4) above apply for that technique as well.

Meeting the first requirement is simply a task of providing the appropriate loop interation count. The second condition indicates the need to 'normalize' the generated quotient bits such that the most significant quotient bit resides in the most significant bit of SL1B. This can be performed by initializing SL1B to zero and then forcing a 'dummy' quotient bit (a one) into the register before the division process is started. Once the first loop has been completed, the LZD logic can be used to position the dummy bit at the bit 65 position. Two left shifts of SL1B complete the normalizing process. Providing additional tables of constants is highly undesirable due to the impact on the size of the CONSTANT ROM. However, a comparison between the double precision error K inverses and the single precision error K inverses revealed that using the double precision error correcting constants for single precision calculations is acceptable, since the disparity between the constants is well beyond the precision of the result.

Since the flows for the double precision instructions use extended precision procedures for argument reduction, it is desirable to use that code for single precision instructions also. This choice also helps to avoid introducing additional error when the approximation is combined with the rest of the reduction procedure to provide a final answer. However, the result has different overflow and underflow thresholds, because it must always be rounded to single precision. Because of this, any single precision routines may use the extended precision flow up to the point where this rounding and validation operation occurs. At that time, a separate flow must be used. Thus, except for a few additional instruction entry micro instructions and IEEE special case traps (zeroes, infinities, etc.), all of the double precision flows can be used for single precision. The extra microinstructions must, of course, convey the different loop termination count to the approximator. Alternatively, this could be done with a special control bit which selects a different loop termination count in the FPLA.

Often the approximator flows call the flows for the normal floating point operations, such as ADD, SUBTRACT, etc. For completeness, pseudo code flows for these support functions are shown in FIGS. B-7 through B19 of the Appendix.

In the flows for the trigonometric functions, the arguments are initially scaled to within the domain of the CORDIC algorithm using identities similar to those provided by Walther. (See FIG. B-20 and 23 in the Appendix). However, the IEEE remainder routine was used instead of a modulo remainder routine. This choice eliminated problems associated with accumulation of error in the X equation. In Walther's scheme, as the remainder approaches pi/2, cosine(x) approaches 0. Since the implied exponent of the X register is zero, the register accumulates leading zeroes. When normalized, considerable error could be introduced. The use of the IEEE remainder function shows that If W REM $pi/2 = D$ Then $-pi/4 <= D <= pi/4$ And COS($-pi/4$) $<= X <=$ COS ($pi/4$)

And SIN($-pi/4$) $<= Y <=$ SIN ($pi/4$)

with the proper choice of initial register values. This means that the answers generated are, at most, unnormalized by one bit position thoughout the domain of the input, since $|\max(X)| = |\max(Y)| \approx 0.707.$ The pseudo code for the SIE and COSine functions are shown in FIGS. B-21 and B-22, respectively. For these functions the remainder is computed using an unrounded, 66 bit constant. During the calculation of the remainder, a division is performed, and therefore, a quotient is generated. As many as the least significant 64 bits of the unsigned quotient are provided internally, besides the remainder. The least two signficant bits of the quotient and the sign of the instruction operand determine which approximating function must be applied to the remainder to provide the desired function of the non-reduced argument. Since a well behaved SINE and COSINE are calculated simultaneously, the TANGENT function was calculated as shown in FIG. B-23 of the Appendix at a cost of one divide time beyond that required for a SINE or COSINE. The pseudo code for the TANGENT function is shown in FIG. B-24 of the Appendix.

The pseudo code for the ATAN(y/x) and ATAN(x) functions are shown in FIGS. B-27 and B-28. The ATAN(x) is simply a call to the more general case with the divisor forced to one. Using ATAN(y/x) allows an implicit divide to be performed as shown in FIG. B-25 of the Appendix, should the magnitude of the arguments mandate further reduction. Also, the ATAN(y/x) flow allows the ASIN to be calculated with still an additional divide time savings. This means that a total of two divide times can be saved, using ATAN(y/x). Since the denominator passed by the ATAN(x) flow to the ATAN(y/x) flow is always positive, ATAN(x) evaluates such that the principal values lie on the iterval shown in FIG. B-29 of the Appendix. As can be seen in FIG. B-26 of the Appendix, the characteristics of the ATAN(y/x) function are such that the choice of operations for the y=x case could have been the same as those for the y<x case.

A relatively minor addition of microcode, plus the use of the ATAN(y/x) function, allowed the incorporation of the ASIN and ACOS functions. Their reduction identities are given in FIG. B-30 of the Appendix. The argument is checked to see if it resides in the domain of its respective function; both are undefined outside the closed interval, $[-1, +1]$. The pseudo code for the ASIN(x) and ACOS(x) flows is given in FIGS. B-31 and B-32 of the Appendix. Note that the special case of the argument equal to one would not have to be checked, if the mode 2 approximator was a restoring algorithm. This is because the occurrence of a zero would return zero. However, due to 'noise' in the nonrestoring algorithm, the case of exactly one must be checked. For both instructions, the correct answers are obtained by allowing the reduction operations to be performed. Because of the periodic nature of these instructions, their evaluation yields multiple values for each argument. To retain the characteristics of a true function, each of the functions must evaluate to a single value of reach input. Therefore, arbitrary principal values have been chosen as shown in FIG. B-33 of the Appendix.

The argument reduction for the Etox function is shown in FIG. B-34 of the Appendix. Using Meggitt's approximator, the X register approaches etox(x) during the course of the iterating sequence. This result may be applied in the mode 3 approximator to increase it domain to $(-0.5, +\ln 2)$. The argument is first reduced to be less than the natural logarithm of the square root of two by performing [x REM ln2=D]. Internally, the remainder flow also returns up to 64 quotient bits (q) to the calling flow. These are always the least significant 64 bits, since it is possible to acquire more. The remainder is then passed to the mode 3 approximator, which returns the exponentiated remainder minus one. According to the reduction identity, the exponent of the result is simply the sum of the quotient information and the exponent of the answer returned by the approximator.

Because there exists the possiblity of an overflow, and because the existing quotient bits can not be directly examined to determine all cases of an overflow condition, a test must be executed to investigate that possibility. An overflow exists if the number of quotient bits generated in the call to the REM flow exceeds the size of an exponent, i.e. overflow = #quotient bits > 16

On the other hand, the number of quotient bits can be calculated without examining the actual quotient bits by using the exponents of the operands:

quotient bits = dividend·e − divisor·c + 1

Since the instruction is peforming a remainder operation with a constant divisor, the divisor's exponent is always the same; it is two to the minus one for the chosen constant (ln 2). The dividend for the remainder function is always the argument to the etox function. Thus, by substitution and combining the above relationships:

overflow = arg·e − (−1) + 1 > 16

Performing a little algebraic manipulation on the test yields:

overflow = arg·e − 14 < 0

However, if the relational operator, '>', is replaced with '> =' in the flow, the test reduces to that of performing a subraction followed by a test of the sign of the result (exponents are two's complement numbers) to determine if an overflow occurred:

overflow = arg·e − 15 < −1 overflow = arg·e − 15 > =0

The pseudo code for this test is shown in FIG. B-35 of the Appendix, while the pseudo code for Etox is shown in FIG. B-36 of the Appendix. It is interesting to note that an argument to Etox with a negative exponent will never cause more than one quotient bit to be generated. Thus, arguments with negative exponents need not be considered in the overflowed quotient bit test.

As shown in the argument reduction identities and pseudo code in FIGS. B-37 through B-40 of the Appendix, exponentiation of two other common bases, Tentox and Twotox, is provided at modest expense of code and time.

The argument reduction identity and pseudo code that evaluate the Etoxml function over the domain of possible input arguments are shown in FIGS. B-41 and B-42 of the Appendix. Since the X register can be made to converge to etox(x), while the Y register is converging on etoxml(x) for positive x, calculation on the interval from $-\ln 2 < x < 0$ is done at the cost of an additional divide time. The remaining intervals on the domain of the input argument are provided by calling the Etox(x) function and explicitly performing the subtract.

The pseudo code for the Ytox function is shown in FIG. B-43 of the Appendix. It uses integer exponentiation by application of repeated squares, for integer X. Beyond THRESHOLD, a log/anti-log method is used. A slower, but significantly smaller routine useful for the "norm/norm" case is also shown in FIG. B-44 of the Appendix. Routines to evaluate special case operands are shown in FIGS. B-46 of the Appendix. The entry points for each of the special cases are shown in FIG. B-45 of the Appendix.

The Lognpl function is provided to help maintain accuracy in calculations where logarithms of values near unity are desired. For this function, the mode 4 approximator is called directly, if the argument lies on the interval, $(-0.5, +1.0)$. For arguments on the two intervals $[-1.0, -0.5]$ and $[+1.0, +\infty]$, one is added to the argument and the natural logarithm routine is used. The argument reduction identity and the pseudo code for the Lognpl function are shown in FIGS. B-47 and B-48 of the Appendix.

The natural logarithm function is also calculated using the mode 4 approximator. The argument reduction procedure and the pseudo code routines for this function are shown in FIGS. B-49, B-50 and B-51 of the Appendix. The mode 4 approximator actions are tightly coupled with the argument reduction procedure, which relies on the fact that a "normalized" number is one that has a mantissa containing only fraction bits. The most significant of these bits must lie to the right of the radix point. Note that the pseudo code does not show a check for negative arguments, which must be reported as operand errors. The A2 PLA 34 will trap these cases, eliminating the need for the main line flow to do so.

Logarithms in two other common bases, Log10 and Log2, are provided at minimal microcode expense. The argument reduction procedure and the pseudo code flow for these functions are shown in FIGS. B-52 and B-53 of the Appendix. First, the natural logarithm of the argument is calculated. Then, depending on the function, either the log base ten of e (the natural number) or the log base two of e is multiplied by the computed natural logarithm.

For the Sinh(x) and Cosh(x) functions, the scaling identities for Sinh(x) and Cosh(x) shown in FIG. B-54 of the Appendix are those provided by Dr. W. Kahan of the University of California at Berkeley. The pseudo code flows for these functions and the related Tanh(x) function are shown in FIGS. B-55, B-56 and B-57 of the Appendix.

The argument reduction procedure and the pseudo code flow for the Atanh(x) function are shown in FIGS. B-58 and B-59 of the Appendix. The argument is first checked to see if it lies in the domain of the function, i.e. on the open interval, $(-1, +1)$. An operand error condition is reported for an improperly sized function input. When the absolute value of the input argument equals one, a divide by zero exception is flagged. Thus, the answer returned will be a properly signed infinity. Once the validity of the argument has been determined, the evaluation proceeeds in a straight forward manner.

A. APPENDIX - _Derivations and Equations_

Figure A-1: Approximator Modes

|  | MODE 1 | MODE 2 |
|---|---|---|
| circular --> | sine<br>cosine<br>tan | asin<br>acos<br>atan |
| hyperbolic --> | sinh<br>cosh<br>tanh<br>etox<br>twotox<br>tentox<br>etoxm1 | atanh<br>logn<br>log2<br>log10<br>lognp1 |
|  | MODE 3 | MODE 4 |

Figure A-2: CORDIC Iteration Equations $$X_{i+1} = X_i \pm M Y_i 2^{-i}$$

$$Y_{i+1} = Y_i \mp X_i 2^{-i}$$

$$Z_{i+1} = Z_i \pm \alpha_i$$

Figure A-3: CORDIC Circular and Hyperbolic K Inverses $$K^{-1}_{M=+1} = \prod_{i=a}^{n-a} 1/K_i = \prod_{i=a}^{n-a} \cos(\alpha_i)$$

$$K^{-1}_{M=-1} = \prod_{i=a}^{n-a} 1/K_i = \prod_{i=a}^{n-a} \cosh(\alpha_i)$$

Figure A-4: CORDIC Rotation Mode, M = 1

Given:

$$X_n = K \{ X_0 \cos(\alpha M^{1/2}) + Y_0 M^{1/2} \sin(\alpha M^{1/2}) \} \qquad 1)$$

$$Y_n = K \{ Y_0 \cos(\alpha M^{1/2}) - X_0 M^{-1/2} \sin(\alpha M^{1/2}) \} \qquad 2)$$

$$Z_n = Z_0 + \alpha \qquad 3)$$

Where:

$$\alpha = \sum_{i=0}^{n-1} \alpha_i \qquad K = \prod_{i=0}^{n-1} K_i$$

Driving Z towards zero:

$$0 = Z_0 + \alpha$$

$$\alpha = -Z_0$$

Substituting into (1):

$$X_n = K \{ X_0 \cos(-Z_0 M^{1/2}) + Y_0 M^{1/2} \sin(-Z_0 M^{1/2}) \}$$

$$X_n = K \{ X_0 \cos(-Z_0) + Y_0 \sin(-Z_0) \}$$

Since $$\cos(\beta) = \cos(-\beta) \quad \text{AND} \quad -\sin(\beta) = \sin(-\beta)$$

$$X_n = K \{ X_0 \cos(Z_0) - Y_0 \sin(Z_0) \}$$

From (2):

$$Y_n = K \{ Y_0 \cos(-Z_0) - X_0 \sin(-Z_0) \}$$

$$Y_n = K \{ Y_0 \cos(Z_0) + X_0 \sin(Z_0) \}$$

Figure A-5: CORDIC Vectoring Mode, M = 1

Given:

$$X_n = K \{ X_0 \cos(\alpha M^{1/2}) + Y_0 M^{1/2} \sin(\alpha M^{1/2}) \} \qquad 4)$$

$$Y_n = K \{ Y_0 \cos(\alpha M^{1/2}) - X_0 M^{-1/2} \sin(\alpha M^{1/2}) \} \qquad 5)$$

$$Z_n = Z_0 + \alpha \qquad 6)$$

Driving Y to zero: (from 5)

$$0 = K \{ Y_0 \cos(\alpha M^{1/2}) - X_0 M^{-1/2} \sin(\alpha M^{1/2}) \}$$

Substituting M = 1 and eliminating K $$0 = Y_0 \cos \alpha - X_0 \sin \alpha$$

$$Y_0 \cos \alpha = X_0 \sin \alpha$$

$$\tan \alpha = Y_0 / X_0$$

$$\alpha = \tan^{-1}(Y_0 / X_0) \qquad 7)$$

Substituting into 6)

$$Z_n = Z_0 + \tan^{-1}(Y_0 / X_0)$$

From 4):

$$X_n = K \{ X_0 \cos \alpha + Y_0 \sin \alpha \}$$

The statement in 7) gives the following two equations:

$$\cos \alpha = X_0 / \sqrt{X_0^2 + Y_0^2}$$

$$\sin \alpha = Y_0 / \sqrt{X_0^2 + Y_0^2}$$

So by substituting for the sine, cosine, and M into 4):

$$X_n = K \{ ( X_0^2 / \sqrt{X_0^2 + Y_0^2} ) + ( Y_0^2 / \sqrt{X_0^2 + Y_0^2} ) \}$$

$$X_n = K ( X_0^2 + Y_0^2 / \sqrt{X_0^2 + Y_0^2} ) = K \sqrt{X_0^2 + Y_0^2}$$

Figure A-6: CORDIC Rotation Mode, M = -1

Given:

$$X_n = K \{ X_\theta \cos(\alpha M^{1/2}) + Y_\theta M^{1/2} \sin(\alpha M^{1/2}) \} \qquad 8)$$

$$Y_n = K \{ Y_\theta \cos(\alpha M^{1/2}) - X_\theta M^{-1/2} \sin(\alpha M^{1/2}) \} \qquad 9)$$

$$Z_n = Z_\theta + \alpha \qquad 10)$$

Driving Z to zero:

$$\alpha = -Z_\theta$$

Substituting into 8) with M = -1 and let $$M^{1/2} = I$$

$$X_n = K \{ X_\theta \cos(-Z_\theta I) + Y_\theta I \sin(-Z_\theta I) \}$$

$$\cos(\beta) = \cos(-\beta) \qquad -\sin(\beta) = \sin(-\beta)$$

$$X_n = K \{ X_\theta \cos(Z_\theta I) - Y_\theta I \sin(Z_\theta I) \}$$

$$\sinh(\beta) = -I \sin(I\beta) \quad \text{AND} \quad \cosh(\beta) = \cos(I\beta)$$

$$X_n = K \{ X_\theta \cosh Z_\theta + Y_\theta \sinh Z_\theta \}$$

From 9):

$$Y_n = K \{ Y_\theta \cos(-Z_\theta I) - X_\theta I^{-1} \sin(-Z_\theta I) \}$$

$$I^{-1} = -I$$

$$Y_n = K \{ Y_\theta \cos(-Z_\theta I) + X_\theta I \sin(-Z_\theta I) \}$$

$$= K \{ Y_\theta \cos(Z_\theta I) - X_\theta I \sin(Z_\theta I) \}$$

$$Y_n = K \{ Y_\theta \cosh Z_\theta + X_\theta \sinh Z_\theta \}$$

Figure A-7: CORDIC Vectoring Mode, M = -1

Given:

$$X_n = K \{ X_\theta \cos(\alpha M^{1/2}) + Y_\theta M^{1/2} \sin(\alpha M^{1/2}) \} \qquad 11)$$

$$Y_n = K \{ Y_\theta \cos(\alpha M^{1/2}) - X_\theta M^{-1/2} \sin(\alpha M^{1/2}) \} \qquad 12)$$

$$Z_n = Z_\theta + \alpha \qquad 13)$$

Driving Y to zero: (from 12)

$$0 = K \{ Y_\theta \cos(\alpha M^{1/2}) - X_\theta M^{-1/2} \sin(\alpha M^{1/2}) \}$$

Substituting M = -1 and eliminating K $$0 = Y_\theta \cos(\alpha I) - X_\theta I \sin(\alpha I)$$

$$\sinh(\beta) = -I \sin(I\beta) \quad \text{AND} \quad \cosh(\beta) = \cos(I\beta)$$

$$Y_\theta \cosh \alpha = X_\theta \sinh \alpha$$

$$\tanh \alpha = Y_\theta / X_\theta$$

$$\alpha = \tanh^{-1}(Y_\theta / X_\theta) \qquad 14)$$

Substituting into 13)

$$Z_n = Z_\theta + \tanh^{-1}(Y_\theta / X_\theta)$$

From 11):

$$X_n = K \{ X_\theta \cosh \alpha - Y_\theta \sinh \alpha \}$$

The statement in 14) gives the following two equations:

$$\cosh \alpha = X_\theta / \sqrt{X_\theta^2 - Y_\theta^2}$$

$$\sinh \alpha = Y_\theta / \sqrt{X_\theta^2 - Y_\theta^2}$$

So by substituting for the sine, cosine, and M into 11):

$$X_n = K \{ (X_\theta^2 / \sqrt{X_\theta^2 - Y_\theta^2}) - (Y_\theta^2 / \sqrt{X_\theta^2 - Y_\theta^2}) \}$$

$$X_n = K \{ (X_\theta^2 - Y_\theta^2) / \sqrt{X_\theta^2 - Y_\theta^2} \} = K \sqrt{X_\theta^2 - Y_\theta^2}$$

Figure A-8: CORDIC Iteration Equations with Walther's Scaling $$X_{i+1} = X_i - Y_i * \beta^{-f}$$

$$Y_{i+1} = Y_i + X_i * \beta^{-f}$$

$$Z_{i+1} = Z_i - \alpha_f$$

$$X = X'$$
$$Y = Y' * \beta^{-e}$$
$$Z = Z' * \beta^{-e}$$
$$\alpha_f = \alpha'_f * \beta^{-f}$$

$$X'_{i+1} = X'_i - Y'_i * \beta^{-e} * \beta^{-f}$$
$$Y'_{i+1} * \beta^{-e} = Y'_i * \beta^{-e} + X'_i * \beta^{-f}$$
$$Z'_{i+1} * \beta^{-e} = Z'_i * \beta^{-e} + \alpha'_i * \beta^{-f}$$

$$Y' = Y'_i - X'_i * \beta^{-f+e}$$
$$X'_{i+1} = X'_i + Y'_i * \beta^{-f-e}$$
$$Z'_{i+1} = Z'_i + \alpha'_i * \beta^{-f+e}$$

$$X_{i+1} = X_i \pm M Y_i 2^{-j}$$
$$Y_{i+1} = Y_i \mp X_i 2^{-k}$$
$$Z_{i+1} = Z_i \pm \alpha_i 2^{-k}$$

Figure A-9: Proof of Walther's ATANH Identity for CORDIC

Given:

$$LN\ X = 2\ TANH^{-1}[(X-1)/(X+1)] \quad\quad 15)$$

$$TANH^{-1}[(X-1)/(X+1)] = 1/2\ LN\ X$$

Let $$D = X-1/X+1$$

Then, $$X = 1+D/(1-D)$$

Thus, $$TANH^{-1}\ D = 1/2\ LN\ [(1+D)/(1-D)] \quad\quad 16)$$

Let $$D = 1 - W$$

then from (16)

$$TANH^{-1}(1-W) = 1/2\ LN\ (2-W) - 1/2\ LN\ W$$

Representing W in floating point, let $$W = M2^E$$

$$TANH^{-1}(1-M2^E) = 1/2\ LN\ [(2-M2^E)/M] - E/2\ LN\ 2$$

If $$(2-M2^E)/M = (1+T)/(1-T)$$

Then by 16)

$$1/2\ LN\ [(2-M2^E)/M] = TANH^{-1}(T)$$

Solving for T:

$$T = (2-M2^E-M)/(2-M2^E+M)$$

And therefore:

$$TANH^{-1}(X) = TANH^{-1}(1-W) = TANH^{-1}(T) - E/2\ LN\ 2$$

$$T = (2-M-M2^E)/(2+M-M2^E)$$

Figure A-10: Logarithm Quotient Digit Relationship

For logarithms the quotient digits are chosen to satisfy the relationship:

$$Y + X = X \prod_{J=0} (1 + \beta^{-J})^{Q_J} \qquad 17)$$

where Beta = radix of numbers X and Y.

Figure A-11: Log(1+y/x) Multiplier Loop Derivation $$Y + X = X \prod_{J=0} (1 + \beta^{-J})^{Q_J}$$

$$1 + Y/X = \prod_{J=0} (1 + \beta^{-J})^{Q_J}$$

$$LOG(1 + Y/X) = LOG(\prod_{J=0} (1 + \beta^{-J})^{Q_J})$$

$$LOG(1 + Y/X) = \sum_{J=0} LOG(1 + \beta^{-J})^{Q_J}$$

$$LOG(1 + Y/X) = \sum_{J=0} Q_J\ LOG(1 + \beta^{-J})$$

Figure A-12: Log(1+y/x) Division Loop Derivation $$Y_a = Y - X \left\{ \left[ \prod_{k=0}^{J-1} (1+\beta^{-k})^{Q_k} \right] (1+\beta^{-J})^a - 1 \right\}$$

$$Y_{a+1} = Y - X \left\{ \left[ \prod_{k=0}^{J-1} (1+\beta^{-k})^{Q_k} \right] (1+\beta^{-J})^{a+1} - 1 \right\}$$

$$= Y - X \left\{ \left[ \prod_{k=0}^{J-1} (1+\beta^{-k})^{Q_k} \right] (1+\beta^{-J})^a (1+\beta^{-J}) - 1 \right\}$$

$$= Y - X \left\{ \left[ \prod_{k=0}^{J-1} (1+\beta^{-k})^{Q_k} \right] (1+\beta^{-J})^a \right.$$
$$\left. + \left[ \prod_{k=0}^{J-1} (1+\beta^{-k})^{Q_k} \right] (1+\beta^{-J})^a \beta^{-J} - 1 \right\}$$

$$= Y - X \left\{ \left[ \prod_{k=0}^{J-1} (1+\beta^{-k})^{Q_k} \right] (1+\beta^{-J})^a - 1 \right\}$$

$$- X \left\{ \left[ \prod_{k=0}^{J-1} (1+\beta^{-k})^{Q_k} \right] (1+\beta^{-J})^a \right\} \beta^{-J}$$

$$Y_{a+1} = Y_a - X \left\{ \left[ \prod_{k=0}^{J-1} (1+\beta^{-k})^{Q_k} \right] (1+\beta^{-J})^a \right\} \beta^{-J}$$

$$X_a = X \left\{ \left[ \prod_{k=0}^{J-1} (1+\beta^{-k})^{Q_k} \right] (1+\beta^{-J})^a \right\}$$

$$X_{a+1} = X \left\{ \left[ \prod_{k=0}^{J-1} (1+\beta^{-k})^{Q_k} \right] (1+\beta^{-J})^{a+1} \right\}$$

$$= X \left\{ \left[ \prod_{k=0}^{J-1} (1+\beta^{-k})^{Q_k} \right] (1+\beta^{-J})^a (1+\beta^{-J}) \right\}$$

$$X_{a+1} = X_a + \beta^{-J} X_a$$

$$Y_{a+1} = Y_a - \beta^{-J} X_a$$

Figure A-13: Prescaling Applied to Meggitt's Method $$Y_{i+1} = Y_i - X_i * \beta^{-f}$$

$$X_{i+1} = X_i + X_i * \beta^{-f}$$

$$Z_{i+1} = Z_i - \delta_f$$

$$X = X'$$
$$Y = Y' * \beta^{-e}$$
$$Z = Z' * \beta^{-e}$$
$$\delta_f = \delta'_f * \beta^{-f}$$

$$Y'_{i+1} \beta^{-e} = Y'_i * \beta^{-e} - X'_i * \beta^{-f}$$

$$X'_{i+1} = X'_i + X'_i * \beta^{-f}$$

$$Z'_{i+1} \beta^{-e} = Z'_i * \beta^{-e} + \delta'_i * \beta^{-f}$$

$$Y'_{i+1} = Y'_i - X'_i * \beta^{-f+e}$$

$$X'_{i+1} = X'_i + X'_i * \beta^{-f}$$

$$Z'_{i+1} = Z'_i + \delta'_i * \beta^{-f+e}$$

Figure A-14: Assumed Z Equation for Meggitt's Method

In the derivation assume the addition of a "Z" equation which accumulates a result by performing:

$$Z = \sum_{k=0}^{J-1} Q_J \, LOG \, (1+\beta^{-J}) \qquad 18)$$

Figure A-15: Huntsman's Hybrid Iteration Equations for Mode 4

$$X_{i+1} = X_i + Q_i X_i * 2^{-J}$$

$$Y_{i+1} = Y_i - Q_i X_i * 2^{-k}$$

$$Z_{i+1} = Z_i + Q_i \delta_i * 2^{-k}$$

where $Q$ in $\{0,1\}$ for a radix two machine

Figure A-16: A Process for Exponentials for Meggitt's Method $$P = \sum_{J=0} Q_J \text{LOG}(1 + \beta^{-J}) \qquad 19)$$

$$P = \sum_{J=0} \text{LOG}(1 + \beta^{-J})^{Q_J}$$

$$P = \text{LOG} \prod_{J=0}(1 + \beta^{-J})^{Q_J} \qquad 20)$$

$$\text{ETOX}(P) = \prod_{J=0}(1 + \beta^{-J})^{Q_J}$$

$$\text{ETOX}(P) - 1 = [\prod_{J=0}(1 + \beta^{-J})^{Q_J}] - 1$$

$$X(\text{ETOX}(P) - 1) = X\{[\prod_{J=0}(1 + \beta^{-J})^{Q_J}] - 1\} \qquad 21)$$

Then to calculate the right hand side assume that $$X\{[\prod_{k=0}^{J-1}(1 + \beta^{-k})^{Q_k}] - 1\} \qquad 22)$$

has already been calculated and attempt accumulation of the next factor of $$(1 + \beta^{-J}) \qquad 23)$$

Figure A-17: Multiplication Loop for X * (etox(P) - 1)

$$Y_a = X[\prod_{k=0}^{J-1}(1 + \beta^{-k})^{Q_k}(1 + \beta^{-J})^a - 1] \qquad 24)$$

$$X_a = X[\prod_{k=0}^{J-1}(1 + \beta^{-k})^{Q_k}(1 + \beta^{-J})^a] \qquad 25)$$

$$Y_{a+1} = X[\prod_{k=0}^{J-1}(1 + \beta^{-k})^{Q_k}(1 + \beta^{-J})^{a+1} - 1]$$

$$= X[\prod_{k=0}^{J-1}(1 + \beta^{-k})^{Q_k}(1 + \beta^{-J})^a(1 + \beta^{-J}) - 1]$$

$$= X[\prod_{k=0}^{J-1}(1 + \beta^{-k})^{Q_k}(1 + \beta^{-J})^a - 1 + [\prod_{k=0}^{J-1}(1 + \beta^{-k})^{Q_k}(1 + \beta^{-J})^a]\beta^{-J}]$$

$$= \{X [ \prod_{k=0}^{J-1}(1 + \beta^{-k})^{Q_k} (1 + \beta^{-J})^a - 1\} + \{X[\prod_{k=0}^{J-1}(1 + \beta^{-k})^{Q_k} (1 + \beta^{-J})^a ]\beta^{-J}$$

$$Y_{a+1} = Y_a + X_a \beta^{-J} \qquad 26)$$

$$X_{a+1} = X [ \prod_{k=0}^{J-1}(1 + \beta^{-k})^{Q_k} (1 + \beta^{-J})^{a+1} ]$$

$$= X [ \prod_{k=0}^{J-1}(1 + \beta^{-k})^{Q_k} (1 + \beta^{-J})^a (1 + \beta^{-J}) ]$$

$$= [X \prod_{k=0}^{J-1}(1 + \beta^{-k})^{Q_k} (1 + \beta^{-J})^a ] + [X\{\prod_{k=0}^{J-1}(1 + \beta^{-k})^{Q_k} (1 + \beta^{-J})^a\}\beta^{-J}]$$

$$X_{a+1} = X_a + X_a \beta^{-J} \qquad 27)$$

Figure A-18: Huntsman's Hybrid Iteration Equations for Mode 3

$$X_{i+1} = X_i + Q_i X_i * 2^{-J}$$

$$Y_{i+1} = Y_i + Q_i X_i * 2^{-k}$$

$$Z_{i+1} = Z_i - Q_i X_i * 2^{-k}$$

where Q in {0,1} for a radix two machine

Figure A-19: Huntsman's Hybrid Iteration Equations for Modes 1 & 2

$$X_{i+1} = X_i + Q_i Y_i 2^{-J}$$

$$Y_{i+1} = Y_i - Q_i X_i 2^{-k}$$

$$Z_{i+1} = Z_i + Q_i \alpha_i 2^{-k}$$

where Q in {-1,+1}.

Figure A-20: CORDIC Convergence Criteria

Each successive angle must be smaller than any of its predecessors:

$$\alpha_0 > \alpha_1 > \alpha_2 > \ldots > \alpha_{n-1} \qquad (28)$$

The starting angle is arbitrary, so long as the sum/difference of the remaining angles in the sequence can drive the argument to zero:

$$\alpha_i - \sum_{k=i+1}^{n-1} U_k \alpha_k < \alpha_{n-1} \qquad (29)$$

where $U$ in $\{+1, -1\}$

B. APPENDIX – Pseudo Code and Argument Reduction Identities

Pseudo Code Syntax

This section discusses the syntactic form chosen for the pseudo code used to explain the operation of the algorithms in this document.

Each pseudo code example is a procedure. First, it is assumed that: the three characters, ::=, can be read as 'defines'; an unadorned character string denotes a terminal symbol; <character string> denotes a non-terminal symbol; [symbol] denotes an optional symbol (terminal or non-terminals may be used); and, {symbol} denotes zero or more repetitions of a symbol (terminals or non-terminals may be used). With these assumptions the basic form of a pseudo code procedure is:

```
Procedure <procedure name> ( [ <variable list> ] )
   Parameters
      { <variable list> : <variable type> }
   Storage:
      { <variable list> : <variable type> }
   Begin
      <procedure body>
   End.

where
   <variable>         ::= <any string of characters>
   <variable list>    ::= <variable> {,<variable>}
   <variable type>    ::= <character string explaining type>
   <procedure body>   ::= <a list of statements explaining
                          data manipulation in the procedure>
```

The explanation of the variable types should be clear. Only the syntax of the floating point type need be discussed. The floating point type is thought to be comprised of six parts: an unsigned integer mantissa; a bit representing the sign of the mantissa; a two's complement integer exponent; a guard bit; a rounding bit; and a sticky bit. If NUM is of type floating point, its mantissa, sign, exponent, guard bit, round bit, and sticky bit are accessed by NUM.m, NUM.s, NUM.e, NUM.g, NUM.r, and, NUM.sticky respectively.

A variable list is a list of the data items imported to or exported from the procedure. The variables in the storage are local to the procedure and are NOT considered initialized upon activation of the procedure.

The statement semantics in a procedure body will be easy to determine. Where there is a possiblity for confusion, formality will be compromised for conceptual clarity.

Some final words. Comments are denoted by enclosing a character string in a /* */ pair. Arrays are accessed with the form, array[index]. All statements in the procedure body start with a capital letter and end with a period for readability. Just assume that all variables are transliterated to lower case. 'Reserved' words, such as If, Then, Else, Endif, etc all begin with capitals. The relational operators used by the code are: < for less than; > for greater than; <= for less than or equal; >= for greater than or equal; = for equal; <> for not equal; and ^ for exponentiation. The arithmetic operators are: * for multiply; / for divide; + for add; - for subtract; and, xor for bitwise exclusive or.

Figure B-1: Number Formats

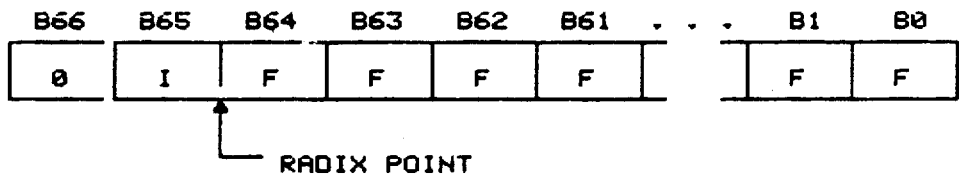

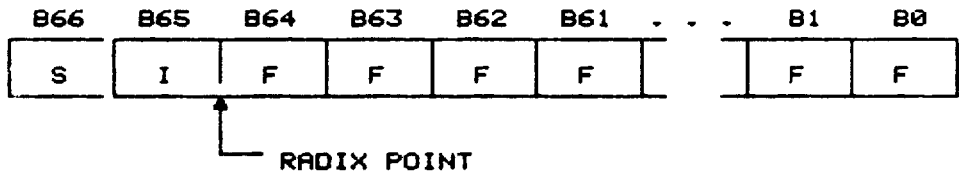

S = SIGN BIT    I = INTEGER BIT    F = FRACTION BIT

Figure B-2: A Methodology for a Two Step Approximating Process

Procedure Two loop method (arg, mode, result1, result2)

```
Parameters:
    arg     : import floating point number
    result1,
    result2: export CORDIC format integer
    mode    : import integer
Storage:
    j, k            : unsigned integer (8 bit)
    f               : integer (17 bit)
    quotient        : array 0 to 64 of bit
    n iterations    : unsigned integer constant = 58
Begin
    K = 0.
    F = arg.e - 1.
    If mode=1 Or mode=3 Then
        Initialize register (z, /*for*/ mode, /*using*/ arg.m ).
    Else  /* mode = 2 or mode = 4 */
        Initialize counter  (j, /*for*/ mode, /*using*/ f).
        Initialize register (y, /*for*/ mode, /*using*/ arg.m ).
        Initialize register (x, /*for*/ mode, /*using*/ arg.m ).
    Endif While k <> n iterations Do
        Determine (quotient[k], /*using*/ j, k, f, x, y, z, mode).
        Finish first loop equations (/*for*/ mode,
            /*using*/ j, k, f, x, y, z ).
    Endwhile

K = 0.

While k <> n iterations Do
        Do second loop equations (/*for*/ mode, /*controlling
            with*/ quotient[k],/*and using*/ j, k, f, x, y, z).
    Endwhile
End.
```

Figure B-3: Mode 1 Approximator Pseudo Code

```
Procedure Mode1 (arg, x, y)

/* The following procedure receives a floating point */
    /* argument, arg, on the interval (0, +pi/4],        */
    /* returns the cosine(arg) in x in CORDIC format,    */
    /* and return the sine(arg) in y in CORDIC format.   */

Parameters:
        arg:     import floating point number
        x,y:     export CORDIC format integer
    Storage:
        iteration count : unsigned integer constant
        z       : CORDIC format integer
        j,k     : unsigned integer (8 bit)
        f       : integer (17 bit)
        qstore  : array 0 to 66 of bits
        alpha   : array 0 to 31 of arctan constants.
        kinv    : array 0 to 31 of inverse K constants.
    Begin
        /* The following is a two loop approximator. The entire  */
        /* process is performed in a non-restoring fashion....   */
        /* Initialize for the pseudo division loop. First point  */
        /* to the first angle in the angle sequence. Second, k   */
        /* doubles as an iteration counter and shift counter.    */
            F = abs(arg.e) - 1.        K = 0.

/* Determine if the approximator needs to be performed  */
        /* at all.                                              */
        If f >= 32 Then /* no use doing the approximation */
            X = 1.
            Y = arg.m/2.

Else
            /* Convert mantissa to CORDIC format and initialize z  */
            Z = arg.m/2.
            /* Perform the pseudo division loop */
                While k < iteration count Do
                    If z < 0 Then
                        Qstore[k] = 1.
                        Z = z + alpha[f] * 2^-k.
                    Else
                        Qstore[k] = 0.
                        Z = z - alpha[f] * 2^-k.
                    Endif
                    K = k + 1.         F = f + 1.
                Endwhile /* Initialize for the multiplication loop */
            K = 0.          F = abs(arg.e) - 1.      J = 2 * F.

X = kinv[f].    Y = 0.
            /* Perform the pseudo multiplication loop */
                While k < iteration count Do
                    If qstore[k] = 1 Then
                        X = x + y * 2 ^ -j.
                        Y = y - x * 2 ^ -k.
                    Else
                        X = x - y * 2 ^ -j.
                        Y = y + x * 2 ^ -k.
                    Endif
                    J = j + 1.      K = k + 1.
                Endwhile
        Endif
    End.
```

Figure B-4: Mode 2 Approximator Pseudo Code

Procedure Mode2 (arg1, arg2, atanyx, relationship)

```
/* The following procedure receives two floating point */
/* arguments, `arg1' and `arg2'; `arg1' < `arg2'       */
/* so that their ratio is on the interval (0,+1]. It   */
/* returns the arc tangent of said quotient in `result'*/
/* Both arguments are assumed to be unsigned, when in  */
/* fact, they may not be.                              */
Parameters:
   arg1, arg2 : import floating point number
   atanyx     : export floating point number
Storage:
   iteration count : unsigned integer constant
   x, y, z    :  CORDIC format integer
   j, k       :  unsigned integer (8 bit)
   f, fsave   :  integer (17 bit)
   qstore     :  array 0 to 66 of bits
   alpha      :  array 0 to 31 of arctan constants.
Begin
   F = arg2.e - arg1.e.
   Fsave = -f.

If f >= 32 Then
      /*
      /* Don't do the approximator since the quotient is */
      /* small enough, such that the approximator loop   */
      /* is useless and only introduces error.
      DIV (y, x, result).

Else  /* set up to perform and perform the approximation */
      Y = arg1.m / 4.
      X = arg2.m / 4.

/* The following is a two loop approximator. The entire */
      /* process is performed in a non-restoring fashion....   */
      /* Initialize the shift counters and registers.          */
      J = 2 * f.                                K = 0.

/* Perform the pseudo division loop */
      While k < iteration count Do
         If y < 0 Then
            X = x - y * 2 ^ -j.
            Y = y + x * 2 ^ -k.
            Qstore[k] = 1.
         Else
            X = x + y * 2 ^ -j.
            Y = y - x * 2 ^ -k.
            Qstore[k] = 0.
         Endif
         J = j + 1.      K = k + 1.
      Endwhile
```

```
        /* Initialize for the multiplication loop */
        K = 0.              Z = 0.

/* Perform the pseudo multiplication loop */
        While k < iteration count Do
            If qstore[k]=0 Then
                Z = z + alpha[f] * 2^-k.
            Else
                Z = z - alpha[f] * 2^-k.
            Endif
            K = k + 1.      F = f + 1.
        Endwhile ZtoIEEE (z, fsave, result).
    Endif
End.
```

Figure B-5: Mode 3 Approximator Pseudo Code

Procedure Mode3 (arg, x, y)

```
/* The following procedure receives a floating point */
/* argument, arg, on the interval [0, +ln2),         */
/* returns the exp(arg) in x in CORDIC format,       */
/* and return the exp(arg)-1 in y in CORDIC format.  */

Parameters:
    arg:    import floating point number
    x,y:    export CORDIC format integer
Storage:
    iteration count : unsigned integer constant
    z:      CORDIC format integer
    qstore: array 0 to 66 of bits
    j,k :   unsigned integer (8 bit)
    f :     unsigned integer (17 bit)
    gamma:  array 0 to 63 of logarithm constants.
Begin
    /* The following is a two loop approximator. Initialize */
    /* for the pseudo division loop. First point to the     */
    /* first angle in the angle sequence. Second, k doubles */
    /* as an iteration counter and shift counter. Init. z.  */
    F = abs(arg.e) - 1.       K = 0.          Z = arg.m.

/* Determine if the approximator needs to be performed */
    /* at all.                                             */
    If f >= 64 Then /* no use doing the approximation */
        X = 1.0.
        Y = arg.m/2.
```

```
        Else
            /* Perform the pseudo division loop */
            While k < iteration count Do
                Z = z - gamma[f] * 2^-k.
                If a borrow occured Then
                    Qstore[k] = 1.
                    Z = z + gamma[f] * 2^-k.
                Else
                    Qstore[k] = 0.
                Endif
                K = k + 1.          F = f + 1.
            Endwhile /* Initialize for the multiplication loop */
            K = 0.              J = abs(arg.e) - 1.

X = 1.0         Y = 0.

/* Perform the pseudo multiplication loop */
            While k < iteration count Do
                If qstore[k] = 0 Then
                    X = x + x * 2 ^ -j.
                    Y = y + x * 2 ^ -k.
                Endif
                K = k + 1.    J = j + 1.
            Endwhile
        Endif
    End.
```

Figure 8-6: Mode 4 Approximator Pseudo Code

Procedure Mode4 (arg, result)

```
/*  The following procedure receives a floating point */
/*  argument, 'arg,' on the interval [-0.5,+2). The   */
/*  ln(1+arg) is returned in 'result' for inputs on   */
/*  [-0.5,+1.0), while ln(arg) is returned for inputs */
/*  on [+1.0,+2.0).                                   */
Parameters:
    arg              : import floating point number
    result           : export floating point number
Storage:
    convertedx       : floating point number
    convertedy       : floating point number
    tempf            : floating point number
    iteration count  : unsigned integer constant
    x, y, z, temp    : CORDIC format integer
    j, k             : unsigned integer (8 bit)
    f                : unsigned integer (17 bit)
    qstore           : array 0 to 66 of bits
    gamma            : array 0 to 63 of logarithm constants.
    one              : floating point constant
Begin
    /* initialization choices */
    F = abs(arg.e) - 1.
    X = arg.m >> 1.

If arg.e = 0 Then  /* initialize to return ln(arg) */
```

```
    Tempf.m = one.m - x.
    Tempf.e = 1.
    Normalize( tempf, tempf).
    Y = tempf.m >> 1.
    F = - tempf.e.
    /* set flag to show that result must be negated */
    Arg.s = negative.
Else
    Y = one.m - x >> f.
    Arg.e = arg.e + 1.
    If arg.s = negative Then  /* ln(1+x) on [-0.5,0) */
        Temp = x.
        X = y.
        Y = temp.
    Else /* ln(1+x) on (0,+1.0) */
        Y = x.
        X = one.m
    Endif
Endif /* Determine whether or not the approximation should be */
/* done by a divide or the Meggitt approximator.        */

If f >= 64 Then  /* do the divide */
    YtoIEEE (y, f, convertedy).

XtoIEEE (x, convertedx).
        DIV (convertedy, convertedx, result).

Else /* Use Meggitt's approxmator */
        J = f.
        K = 0.

/* Perform the pseudo division loop */
        While k < iteration count Do
            Y = y - x * 2 ^ -k.
            If y < 0 Then
                Qstore[k] = 1.
                Y = y + x * 2 ^ -k.
            Else
                Qstore[k] = 0.
                X = x + x * 2 ^ -j.
            Endif
            J = j + 1.     K = k + 1.
        Endwhile /* Initialize for the multiplication loop */
        K = 0.         Z = 0.

/* Perform the pseudo multiplication loop */
        While k < iteration count Do
            If qstore[k]=0 Then
                Z = z + alpha[f] * 2^-k.
            Endif
            K = k + 1.    F = f + 1.
        Endwhile ZtoIEEE (z, arg.e, result).
    Endif
    Result.s = arg.s.
End.
```

Figure B-7: Pseudo Code for IEEE Add Procedure

```
Procedure ADD (addend1, addend2, sum)
   Parameters:
      addend1, addend2: import floating point number
      sum:              export floating point number
   Storage:
      /* none */
   Begin
      /* Notes:
       *
       *    ADD can be called as a subroutine only with normalized
       *    or zero operands.
       *
       *    If one or both of the addends is a form of zero, the
       *    exponent of both addends must be equal for the addition
       *    to succeed.  Usually it is easier to avoid the attempt
       *    altogether.
       *
       *    Both addends must have their g and r bits equal to zero
       *    before the add.  Otherwise, it is possible (because of
       *    the way the leading zero detect logic works) to have a
       *    subnormal result mantissa.  However, if a post-addition
       *    normalization is performed, the addition is allowed,
       *    regardless of the state of the g and r bits.
       *
       *    ADD must be called with sticky cleared.
       *
       */
      The addition operation is performed as specified in
      ANSI/IEEE Std. 754-1985, "IEEE Standard for Binary Floating
      Point Arithmetic".  The result returned is an extended
      precision binary floating point number - unrounded - with
      no overflow/underflow checking performed.
   End.
```

Figure B-8: Pseudo Code for IEEE Compare Procedure

```
Procedure CMP (operand1, operand2, relationship)
   Parameters:
      operand1, operand2:  import floating point number
      relationship: export set of (greater than, equal, less than)
   Storage:
      /* none */
   Begin
      /* Notes:
       *
       * Input operands cannot be NANs or infinities.
       *
       * This internal routine does not actually modify the
       * condition code register even though the microcode
       * for the compare subroutine is the same as that for
       * the instruction.
       */
      Relationship = null set.
      If operand1 = operand2 Then
         Relationship includes equal.
      Endif
      If operand1 > operand2 Then
         Relationship includes greater than.
      Endif
```

```
      If operand1 < operand2 Then
          Relationship includes less than.
      Endif
   End.
```

Figure B-9: Pseudo Code for IEEE Division Procedure

```
Procedure DIV (dividend, divisor, quotient)
   Parameters:
      dividend:   import floating point number
      divisor:    import floating point number
      quotient:   export floating point number
   Storage:
      /* none */
   Begin
      /* Notes:
       *
       * Input operands must be normalized numbers.
       *
       */
      The division operation is performed as specified in
      ANSI/IEEE Std. 754-1985, "IEEE Standard for Binary Floating
      Point Arithmetic". The result returned is an extended
      precision binary floating point number - unrounded - with
      no overflow/underflow checking performed.
   End.
```

Figure B-10: Pseudo Code for IEEE Multiply Procedure

```
Procedure MUL (multiplier, multiplicand, product)
   Parameters:
      multiplier:    import floating point number
      multiplicand:  import floating point number
      product:       export floating point number
   Storage:
      /* none */
   Begin
      /* Notes:
       *    multiplicand.m must be a 64 bit manitissa. This
       *    means that multiplication by an unrounded ROM
       *    can only be done when the constant is the multiplier.
       *
       *    Input operands must be normalized numbers.
       *    MUL cannot be called with a zero as an operand, since
       *    a spurious underflow can be signalled.
       */
      The multiply operation is performed as specified in
      ANSI/IEEE Std. 754-1985, "IEEE Standard for Binary Floating
      Point Arithmetic". The result returned is an extended
      precision binary floating point number - unrounded - with
      no overflow/underflow checking performed.
   End.
```

Figure B-11: Pseudo Code for IEEE Remainder Procedure

```
Procedure REM (dividend, divisor, remainder, quotient)
   Parameters:
      dividend:   import floating point number
```

```
        divisor:    import floating point number
        remainder:  export floating point number
        quotient:   export unsigned integer (64 bit)
    Storage:
        /* none */
    Begin
        /* Notes:
        *   Only the least significant 64 bits of the quotient
        *   are stored in 'quotient'. This means that the quotient
        *   is incomplete and, therefore, can not be sent to 'scale.'
        *
        *   An unrounded divisor may be used.
        */
        The IEEE remainder operation is performed as specified in
        ANSI/IEEE Std. 754-1985, "IEEE Standard for Binary Floating
        Point Arithmetic". The remainder r = x REM y is defined
        regardless of the rounding mode by the mathematical relation
        r = x - y(n), where "n" is the (quotient) integer nearest the e
        value x/y; whenever abs(n - x/y) = 1/2, then "n" is even. Thus,
        remainder is always exact. If r=0, its sign shall be that of "
        The quotient is the integer "n".
    End.
```

Figure B-12: Pseudo Code for Modulo Remainder Procedure

```
Procedure MOD (dividend, divisor, remainder, quotient)
    Parameters:
        dividend:   import floating point number
        divisor:    import floating point number
        remainder:  export floating point number
        quotient:   export unsigned integer (64 bit)
    Storage:
        /* none */
    Begin
        /* Notes:
        *   Only the least significant 64 bits of the quotient
        *   are stored in 'quotient'. This means that the quotient
        *   is incomplete and, therefore, can not be sent to 'scale.'
        *
        *   An unrounded divisor may be used.
        */
        The Modulo remainder operation is NOT specified in
        ANSI/IEEE Std. 754-1985, "IEEE Standard for Binary Floating
        Point Arithmetic". The modulo remainder m = x MOD y is defined
        regardless of the rounding mode by the mathematical relation
        m = x - y(n), where "n" is the (quotient) integer nearest to,
        but no greater in magnitude than the exact value x/y. Thus, the
        modulo remainder is always exact. If r=0, its sign is that of '
        The quotient is the integer "n".
    End.
```

Figure B-13: Pseudo Code for IEEE Round to Extended Procedure

```
Procedure ROUNDext (operand, rounded result)
    Parameters:
        operand:            import floating point number
``` rounded result:    export floating point number
Storage:
    /* none */
Begin
    /* Notes:
    */
    The IEEE Round to Extended operation performs rounding as
    specified in ANSI/IEEE Std. 754-1985, "IEEE Standard for Binary
    Floating Point Arithmetic". The operand is always rounded to
    extended precision regardless of the current rounding precision
    control setting; the rounding mode used is the current rounding
    mode control setting. The INEX exception is not set by this
    procedure.
End.

Figure B-14: Pseudo Code for IEEE Square Root Procedure

Procedure SQRT (operand, root)
    Parameters:
        operand:    import floating point number
        root:       export floating point number
    Storage:
        /* none */
    Begin
        /* Notes:
        */
        The square root operation is performed as specified in
        ANSI/IEEE Std. 754-1985, "IEEE Standard for Binary Floating
        Point Arithmetic". The result returned is an extended
        precision binary floating point number - unrounded - with
        no overflow/underflow checking performed.
    End.

Figure B-15: Pseudo Code for IEEE Subtract Procedure

Procedure SUB (minuend, subtrahend, difference)
    Parameters:
        minuend:    import floating point number
        subtrahend: import floating point number
        difference: export floating point number
    Storage:
        /* none */
    Begin
        /* Notes:
         *
         *   SUB can be called as a subroutine only with normalized
         *   or zero operands.
         *
         *   If one or both of the operands is a form of zero, the
         *   exponent of both operands must be equal for the subtractio
         *   to succeed. Usually it is easier to avoid the attempt
         *   altogether.
         *
         *   Both operands must have their g and r bits equal to zero
         *   before the sub. Otherwise, it is possible (because of
         *   the way the leading zero detect logic works) to have a
         *   subnormal result mantissa. However, if a post-subtraction
         *   normalization is performed, the subtraction is allowed,

```
*       regardless of the state of the g and r bits.
*
*       SUB must be called with sticky cleared.
*/
```
The subtract operation is performed as specified in
ANSI/IEEE Std. 754-1985, "IEEE Standard for Binary Floating
Point Arithmetic". The result returned is an extended
precision binary floating point number - unrounded - with
no overflow/underflow checking performed.
End.

Figure B-16: Pseudo Code for IEEE Validate Procedure

```
Procedure VALID (operand, rounded result)
   Parameters:
      operand:           import floating point number
      rounded result:    export floating point number
   Storage:
      /* none */
   Begin
      /* Notes:
      */
```
The IEEE Validate operation performs rounding and overflow
& underflow checking as specified in ANSI/IEEE Std. 754-1985,
"IEEE Standard for Binary Floating Point Arithmetic". The
operand is rounded using the current rounding precision
control setting and the current rounding mode control
setting. The thresholds used for overflow/underflow checking
correspond to the current round precision control setting.
The result is stored in the destination register, condition
codes are calculated & set; the INEX, OVF, and/or UNF
exceptions may be set.
End.

Figure B-17: Pseudo Code for XtoIEEE Procedure

```
Procedure XtoIEEE (cordic number, IEEE number)
   Parameters:
      cordic number: import CORDIC format integer
      IEEE number:   export floating point number
   Storage:
      temp:          floating point number
   Begin
      If cordic number < 0 Then
         Temp.m = - cordic number.
         Temp.s = negative.
      Else
         Temp.m = cordic number.
         Temp.s = positive.
      Endif
      Temp.e = 0.  /* X has implied exponent of zero */
      Normalize (temp, IEEE number).
   End.
```

Figure B-18: Pseudo Code for YtoIEEE Procedure

```
Procedure YtoIEEE (cordic number, exponent, IEEE number)
    Parameters:
        cordic number:  import CORDIC format integer
        exponent:       import integer (17 bit)
        IEEE number:    export floating point number
    Storage:
        temp:           floating point number
    Begin
        If cordic number < 0 Then
            Temp.m = - cordic number.
            Temp.s = negative.
        Else
            Temp.m = cordic number.
            Temp.s = positive.
        Endif
        Temp.e = exponent + 1.
        Normalize (temp, IEEE number).
    End.
```

Figure B-19: Pseudo Code for ZtoIEEE Procedure

```
Procedure ZtoIEEE (cordic number, exponent, IEEE number)
    Parameters:
        cordic number:  import CORDIC format integer
        exponent:       import integer (17 bit)
        IEEE number:    export floating point number
    Storage:
        temp:           floating point number
    Begin
        If cordic number < 0 Then
            Temp.m = - cordic number.
            Temp.s = negative.
        Else
            Temp.m = cordic number.
            Temp.s = positive.
        Endif
        Temp.e = exponent + 1.
        Normalize (temp, IEEE number).
    End.
```

Figure B-20: Sine(x) and Cos(x) Reduction Identities $$SIN(X) = SIN(Q*\pi/2 + D) = \begin{cases} SIN\ D & IF\ Q\ MOD\ 4 = 0 \\ COS\ D & IF\ Q\ MOD\ 4 = 1 \\ -SIN\ D & IF\ Q\ MOD\ 4 = 2 \\ -COS\ D & IF\ Q\ MOD\ 4 = 3 \end{cases} FOR\ X >= 0$$

$$SIN(X) = SIN(Q*\pi/2 + D) = \begin{cases} SIN\ D & IF\ Q\ MOD\ 4 = 0 \\ -COS\ D & IF\ Q\ MOD\ 4 = 1 \\ -SIN\ D & IF\ Q\ MOD\ 4 = 2 \\ COS\ D & IF\ Q\ MOD\ 4 = 3 \end{cases} FOR\ X < 0$$

$$COS(X) = COS(Q*\pi/2 + D) = \begin{cases} COS\ D & IF\ Q\ MOD\ 4 = 0 \\ -SIN\ D & IF\ Q\ MOD\ 4 = 1 \\ -COS\ D & IF\ Q\ MOD\ 4 = 2 \\ SIN\ D & IF\ Q\ MOD\ 4 = 3 \end{cases} FOR\ X >= 0$$

$$COS(X) = COS(Q*\pi/2 + D) = \begin{cases} COS\ D & IF\ Q\ MOD\ 4 = 0 \\ SIN\ D & IF\ Q\ MOD\ 4 = 1 \\ -COS\ D & IF\ Q\ MOD\ 4 = 2 \\ -SIN\ D & IF\ Q\ MOD\ 4 = 3 \end{cases} FOR\ X < 0$$

Figure 3-21: Sine(x) Pseudo Code

```
Procedure Sine (arg, result)

Parameters:
      arg:     input floating point number
      result:  output floating point number
   Storage:
      quotient bits: unsigned integer (64 bit)
      remainder:     floating point number
      x:             CORDIC format integer
      y:             CORDIC format integer
      pi:            floating point constant
   Begin
      REM (arg, pi/2, /* returning */ remainder, quotient bits)
      If remainder.e < -32 Then
         X = 1.0.
         Y = remainder.m / 2.
      Else
         Model (abs(remainder), x, y).
      Endif
      Case (quotient bits mod 4) Of
         0, 2:
```

```
            YtoIEEE (y, remainder.e, result).
            Result.s = remainder.s.
        1,3:
            XtoIEEE (x, result).
            Result.s = positive.
    Endcase Case (quotient bits mod 4) Of
        0: /* do nothing - done */
        1:
            If arg.s = negative Then
                Result = - result.
            Endif
        2:
            Result = -result.
        3:
            If arg.s = positive Then
                Result = - result.
            Endif
    Endcase
    VALID (result, result).
End.
```

Figure B-22: Cosine(x) Pseudo Code

```
Procedure Cosine (arg, result)

Parameters:
        arg:    input floating point number
        result: output floating point number
    Storage:
        quotient bits: unsigned integer (64 bit)
        remainder:     floating point number
        x,y:           CORDIC format integer
        pi:            floating point constant
    Begin
        REM (arg, pi/2, /* returning */ remainder, quotient bits).
        If remainder.e < -32 Then
            X = 1.0.
            Y = remainder.m / 2.
        Else
            Model (abs(remainder), x, y).
        Endif
        Case (quotient bits mod 4) Of
            0,2:
                XtoIEEE (x, result).
                Result.s = positive.
            1,3:
                YtoIEEE (y, remainder.e, result).
                Result.s = remainder.s.
        Endcase Case (quotient bits mod 4) Of
            0: {do nothing - done}
            1:
                If arg.s = positive Then
                    Result = - result.
                Endif
            2:
                Result = - result.
```

```
    3:
        If arg.s = negative Then
            Result = - result.
        Endif
    Endcase
    VALID (result, result).
End.
```

Figure B-23: Tangent(x) Reduction Identity

```
TAN(X) = TAN(Q*π/2 + D) = {

TAN D  =  SIN D/COS D  IF Q MOD 2 = 0

-COT D = -COS D/SIN D  IF Q MOD 2 = 1   AND D <> 0

}
```

Figure B-24: Tangent(x) Pseudo Code

```
Procedure Tangent (arg, result)

Parameters:
        arg:       input floating point number
        result:    output floating point number
    Storage:
        quotient bits: unsigned integer (64 bit)
        remainder:     floating point number
        sine, cosine:  floating point number
        x, y:          CORDIC format integer
        pi:            floating point constant
    Begin
        REM (arg, pi/2, /* returning */ remainder, quotient bits).
        If remainder.e < -32 Then
            X = 1.0.
            Y = remainder.m / 2.
        Else
            Model (abs(remainder), x, y).
        Endif
        YtoIEEE (y, remainder.e, sine).
        XtoIEEE (x, cosine).
        Case (quotient bits mod 4) of
            0,2:
                DIV (sine, cosine, result).
            1,3:
                DIV (cosine, sine, result).
        Endcase
        VALID (result, result).
    End.
```

Figure B-25: Atan(x) Reduction Identity

ATAN(X) = {

```
        -π/2 - ATAN(1/X)    IFF X < -1

+π/2 - ATAN(1/X)    IFF X > +1

-π/4                IFF X = -1

+π/4                IFF X = +1

ATAN(X)             IFF ABS(X) < 1
    }
```

Figure B-26: Study of f(x) = atan(y/x)

| domain    | y.s | x.s | range of f(x)              | f(x) =         |
|-----------|-----|-----|----------------------------|----------------|
| y/x < 1   | pos | pos | 0     <= f(x) <   pi/4     | atan(y/x)      |
| y/x < 1   | pos | neg | 3/4pi <  f(x) <=  pi       | pi - atan(y/x) |
| y/x < 1   | neg | pos | -pi/4 <  f(x) <=  0        | atan(y/x)      |
| y/x < 1   | neg | neg | -3/4pi < f(x) <= -pi       | -pi - atan(y/x)|
| y/x > 1   | pos | pos | pi/4  <  f(x) <=  pi/2     | pi/2 - atan(x/y)|
| y/x > 1   | pos | neg | pi/2  <= f(x) <   3/4pi    | pi/2 - atan(x/y)|
| y/x > 1   | neg | pos | -pi/2 <= f(x) <  -pi/4     | -pi/2 + atan(x/y)|
| y/x > 1   | neg | neg | -3/4pi < f(x) <  -pi/2     | -pi/2 + atan(x/y)|

Define the approximator as:

```
f(x) = {
            atan(|y|/|x|)  iff |x| > |y| atan(|x|/|y|)  iff |x| < |y|

+pi/4          iff |x| = |y|
        }
```

| y | x | y < x          | y > x              | y = x        |
|---|---|----------------|--------------------|--------------|
| p | p | f(x)           | pi/2 - f(x)        | f(x)         |
| p | n | pi - f(x)      | pi/2 + f(x)        | pi - f(x)    |
| n | p | -f(x)          | -(pi/2 - f(x))     | -f(x)        |
| n | n | -(pi - f(x))   | -(pi/2 + f(x))     | -(pi - f(x)) |

```
        case |y| <= |x|:                    case |y| > |x|:
            compute f(x)                        compute f(x)
            f(x).s = x.s                        f(x).s = x.s*
            if x.s = pos                        const = +pi/2
                const = +0.0                    fpadd
            else                                result = y.s
                const = +pi
            endif
            fpadd
            result = y.s
```

Figure B-27: Atan(y/x) Pseudo Code

```
Procedure Atanyx (abscissa, ordinate, result)
    /* return the arc tangent of the quotient, y/x */
    /* for all non-zero y and x.  Principal values */
    /* lie on -pi < x < +pi                        */
    Parameters:
        abscissa,
        ordinate  : import floating point number
        result    : export floating point number
    Storage:
        relationship: set of (greater than, equal, less than)
        arctan    : floating point number
        const     : floating point number
        zero      : floating point constant
        pi        : floating point constant
    Begin
        CMP (abs(abscissa), abs(ordinate), relationship).
        Arctan.s = ordinate.s.

If relationship includes equals
        or.relationship includes less than Then
            /* the abs of their ratio <= 1 so ... */
            Mode2 (abs(abscissa), abs(ordinate), arctan).
            If ordinate.s = positive Then
                Const = zero.
                /* const's exponent must match artan's for ADD to work */
                Const.e = artan.e.
            Else
                Const = pi.
            Endif
        Else /* the abs of their ratio > 1 so ... */
            Mode2 (abs(ordinate), abs(abscissa), arctan).
            Artan = -artan.
            Const = pi/2.
        Endif
        ADD (const, arctan, result).
        Result.s = abscissa.s.
    End.
```

Figure B-28: Atan(x) Pseudo Code

```
Procedure Atan (arg, result)
    Parameters:
```

```
    arg      : import floating point number
    result   : export floating point number
Storage:
    x        : floating point number
    one      : floating point constant
Begin
    X = one.
    Atanyx (arg, x, result).
End.
```

Figure B-29: Principal Values for Atan(x) Function $-\pi/2 <= ATAN(X) <= +\pi/2$  FOR $-INF < X < +INF$ Figure B-30: Asin(x) and Acos(x) Reduction Identities

ASIN(X) = {

OPERAND ERROR                        IFF ABS(X) > 1

$-\pi/2$                                  IFF X = -1

$+\pi/2$                                  IFF X = +1

$ATAN(X/\sqrt{(1 - X)(1 + X)})$    IFF ABS(X) < 1

}

ACOS(X) = {

OPERAND ERROR                        IFF ABS(X) > 1

$+\pi$                                    IFF X = -1

+0                                       IFF X = +1

$2 * ATAN(\sqrt{(1 - X)/(1 + X)})$    IFF ABS(X) < 1

}

Figure B-31: Asin(x) Pseudo Code

```
Procedure Asin (arg, result)

Parameters:
        arg    : input floating point number
        result : output floating point number
    Storage:
        relationship: set of (greater than, equal, less than)
        sum         : floating point number
```

```
        diff           : floating point number
        one            : floating point constant
        pi             : floating point constant
    Begin
        /* perform asin(arg) = atan (arg/sqrt[(1-arg)(1+arg)]) */
        ADD (one, arg, sum).
        SUB (one, arg, diff).
        ROUNDext (diff, diff).
        MUL (diff, sum, sum).
        If sum.s = negative Then
            OPERAND ERROR.
        Else
            SQRT (sum, sum).
            Atanyx (arg, sum, result).
            VALID (temp, result).
        Endif
    End
```

Figure B-32: Acos(x) Pseudo Code

```
Procedure Acos (arg, result)

Parameters:
        arg:     input floating point number
        result:  output floating point number
    Storage:
        relationship: set of (greater than, equal, less than)
        sum            : floating point number
        diff           : floating point number
        one            : floating point constant
        zero           : floating point constant
        pi             : floating point constant
    Begin
        ADD (one, arg, sum).
        SUB (one, arg, diff).
        DIV (diff, sum, sum).
        If sum.s = negative Then
            OPERAND ERROR.
        Else
            SQRT (sum, sum).
            Atan (sum, result).
            Result.e = result.e + 1.
            VALID (result, result).
        Endif
    End.
```

Figure B-33: Principal Values for Asin(x) & Acos(x) Functions $\pi >= ACOS(X) >= 0$        FOR $-1 <= X <= +1$ $-\pi/2 <= ASIN(X) <= +\pi/2$   FOR $-1 <= X <= +1$ Figure B-34: Argument Reduction for Etox(x)

$$ETOX(X) = [ETOXM1(D) + 1] * 2^q$$

where $0 < X = q \ln2 + D < +\infty$

Figure B-35: Pseudo Code for Overflowed Quotient Check

```
Procedure Overflowed quotient check (arg, quotient, exponent)
    /* Check for occurance of too large a quotient and return  */
    /* a special exponent if so.  Otherwise return the passed  */
    /* integer as the exponent.                                */
    Parameters:
        arg      : import integer
        quotient: import integer
        exponent: export integer
    Storage:
        sign: integer
    Begin
        Sign = arg - 15.
        If sign < 0 Then
            Exponent = quotient.
        Else
            Exponent = $A000.
            /* This exponent allows validation to work, even if */
            /* one arithmetic operation is performed with this  */
            /* number as an operand.                            */
        Endif
    End.
```

Figure B-36: Etox(x) Pseudo Code

```
Procedure Etox (arg, result)

Parameters:
        arg    : import floating point number
        result : export floating point number
    Storage:
        q      : unsigned integer (64 bit)
        temp1  : floating point number
        one    : floating point constant Begin
        REM (arg, ln2, remainder, q).
        Etoxm1 (remainder, temp1).
        ADD (one, temp1, result).
        Temp1.e = q.
        Overflowed quotient check (arg.e, q, temp1.e).
        If arg.s = negative Then
            Temp1.e = - temp1.e.
        Endif
        Result.e = result.e + temp1.e.
        VALID (result, result).
    End.
```

Figure B-37: Reduction for Tentox and Twotox Functions $$10^x = ETOX(R * LN\ 10) * 2^q$$

Where $x = q\ log(base\ 10)\ 2 + R$ and $$2^x = ETOX(F * LN\ 2) * 2^q$$

Where $F$ = fractional part of $(x)$
$q$ = integer part of $(x)$

Figure B-38: Tentox(x) and Twotox(x) Pseudo Code

```
Procedure Tentox (arg, result)
    Parameters:
        arg    : import floating point number
        result : export floating point number
    Storage:
        remainder   : floating point number
        exprem      : floating point number
        q           : unsigned integer (64 bit)
        ln10        : floating point constant
        log10of2    : floating point constant
    Begin
        REM (arg, log10of2, remainder, q).
        ROUNDext (remainder, remainder).
        MUL (remainder, ln10, remainder).
        Etox (remainder, exprem).
        Result.e = q.
        /* Make overflowed quotient check applicable for */
        /* the log10of2 as a divisor for REM              */
        Arg.e = arg.e + 1.
        Overflowed quotient check (arg.e, q, result.e).
        If arg.s = negative Then
            Result.e = - result.e.
        Endif
        Result.e = result.e + exprem.e.
        Result.m = exprem.m.
        Result.s = exprem.s = positive.
        VALID (result, result).
    End.

Procedure Twotox (arg, result)
    Parameters:
        arg    : import floating point number
        result : export floating point number
    Storage:
        temp1  : floating point number
        temp2  : floating point number
        ln2    : floating point constant
    Begin
        FRACTof (arg, temp1).
        MUL (temp1, ln2, temp2).
        Etox (temp2, result).
        SCALE (result, arg).
        VALID (result, result).
    End.
```

Figure B-39: Pseudo Code for FRACTof Procedure

The procedure FRACTof determines the fractional part of
a floating point argument.

```
Procedure FRACTof (arg, fraction)
   Parameters:
      arg      :  import floating point number
      fraction:  export floating point number
   Storage:
      /* no additional storage */
   Begin
      If arg.e >= 0 Then
         Arg.m = arg.m * 2 ^ (arg.e + 1).
         Arg.e = -1.
         Normalize (arg, /* and call it */ fraction).
      Endif
   End.
```

Figure B-40: Twotox(x) Pseudo Code to Save Microcode

```
Procedure Twotox (arg, result)
   Parameters:
      arg    :  import floating point number
      result :  export floating point number
   Storage:
      remainder  : floating point number
      exprem     : floating point number
      q          : unsigned integer (64 bit)
      one        : floating point constant
      ln2        : floating point constant
   Begin
      REM (arg, one, remainder, q).
      ROUNDext (remainder, remainder).
      MUL (remainder, ln2, remainder).
      Etox (remainder, exprem).
      Result.e = q.
      /* Make overflowed quotient check applicable for */
      /* floating point one as a divisor for REM       */
      Arg.e = arg.e - 1.
      Overflowed quotient check (arg.e, q, result.e).
      If arg.s = negative Then
         Result.e = - result.e.
      Endif
      Result.e = result.e + exprem.e.
      Result.m = exprem.m.
      Result.s = exprem.s = positive.
      VALID (result, result).
   End.
```

Figure B-41: Argument Reduction Function for Etoxm1(x)

ETOXM1(X) = {

ETOX(X)-1                              IFF ABS(X) >= LN2

ETOXM1(X)                           IFF ABS(X) < LN2 AND X > 0

-ETOXM1(ABS(X))/ETOX(ABS(X)) IFF ABS(X) < LN2 AND X < 0

}

Figure B-42: Etoxm1(x) Pseudo Code

```
Procedure Etoxm1 (arg, result)
   Parameters:
      arg    : import floating point number
      result : export floating point number
   Storage:
      temp1      : floating point number
      one        : floating point constant
      ln2        : floating point constant
   Begin
      If abs(arg) < ln2 Then
         Mode3 (abs(arg), x, y).
         YtoIEEE (y, result).
         If arg.s = negative Then
            XtoIEEE (x, temp1).
            DIV (result, temp1, result).
            Result.s = negative.
         Endif
      Else
         Etox (arg, result).
         SUB (result, one, result).
      Endif
      VALID (result, result).
   End.
```

Figure B-43: Ytox(y,x) Best Method Pseudo Code

```
Procedure Ytox (y, x, result)
   Parameters:
      y      : import floating point number
      x      : import floating point number
      result : export floating point number
   Storage:
      NAN    : floating point constant
   Begin
      If (y in norm) and (x in norm) Then
         If x.m - (intpart(x)).m <> 0 Then /* x is not an integer */
            If y.s = positive Then
               Result = (etox (x*logn(y))).
            Else
               Result = (NAN w/ iop).
            Endif
         Else If (abs(x) > THRESHOLD) Then
            Result = etox (x * logn(abs(y))).
            If ((y.s = negative) and (!even(x)) Then
               Result = - result.
            Endif
         Else /* x is an integer and x <= THRESHOLD */
            K = fix(abs(x). /* 0 < k <= THRESHOLD */
            Result = y.
```

```
            While even(k) Do
                Result = result * result.
                K = k/2.
            Endwhile
            Y = result.
            K = intpartrz(k/2).
            While k <> 0 Do
                Y = y * y.
                If Not even(k) Then
                    Result = result * y.
                Endif
            Endwhile
            If (x.s = negative) Then
                DIV (1, result, result).
            Endif
        Endif
    End.
```

Figure B-44: Ytox(y,x) Alternative Method Pseudo Code

```
Begin
    If abs(x) = 1 Then
        Answer = abs(y).
    Else If abs(x) = 2 Then
        Answer = y * y.
    Else If x.m - (intpart(x)).m <> 0 And y.s = negative Then
        Return(NAN w/ iop).
    Else
        Answer = etox ( abs(x) * logn(abs(y))).
    Endifs
    If x.s = 1 Then
        Answer = 1 / answer.
    Endif
    If x.m - (intpart(x)).m = 0 and odd(x) Then
        Answer.s = y.s.
    Else
        Answer.s = 0.
    Endif
    Return(answer).
End.
```

Figure B-45: Matrix Table for Ytox Function

| FPN TAG | | NORM 00 + / − | ZERO 01 + / − | INF 10 + / − | NAN 11 + / − |
|---|---|---|---|---|---|
| NORM 00 | + / − | YPWRX | P1 | YPX1 | NAN |
| ZERO 01 | + | YPX2 | P1 | YPX2 | NAN |
|  | − | YPX3 | | | |
| INF 10 | + | YPX2 | P1 | YPX2 | NAN |
|  | − | YPX4 | | | |
| NAN 11 | + / − | NAN.DY | NAN.DY | NAN.DY | NAN.DY |

Figure B-46: Special Evaluations of Ytox

```
Procedure Ypx1 (y, x, result)
/* y=norm, x=inf */
    Parameters:
        y, x  : import floating point number
        result: export floating point number
    Begin
        If x.s = positive Then
            If abs(y) >1 Then
                Result = pinf.
            Else If abs(y) =1 Then
                Result = iop.
            Else /* abs(y) <= 1 /*
                Result = p0.
            Endifs
        Else {x.s=negative}
            If abs(y) >1 Then
                Result = p0.
            Else If abs(y) =1 Then
                Result = iop.
            Else /* abs(y) <= 1 */
                Result = pinf.
            Endifs
        EndIf
    End.

Procedure Ypx2 (y, x, result)
/* y = zero or inf, x=inf */
    Parameters:
        y, x  : import floating point number
        result: export floating point number
    Begin
        If y.e >= MAXEXTEXP ($3FFF and y = inf) Then
            If x.s = positive Then
                Result = pinf.
            Else
                Result = p0.
            Endif
        Else { y = zero }
            If x.s = positive Then
                Result = p0.
            Else
                Result = pinf.
                Signal Divide by Zero exception.
            Endif
        Endif
    End.

Procedure Ypx3 (y, x, result)
/* y = -0, x = norm */
    Parameters:
        y, x  : import floating point number
        result: export floating point number
    Begin
        If x.m - (intpart(x)).m <> 0 Then
            /* x is not an integer */
            If x.s = positive Then
```

```
            Result = p0.
      Else
            Result = pinf.
            Signal Divide by Zero exception.
      Endif
   Else /* x is an integer */
      If even(x) Then
            If x.s = positive Then
               Result = p0.
            Else
               Result = pinf.
               Signal Divide by Zero exception.
            Endif
      Else /* x is odd */
            If x.s = positive Then
               Result = m0.
            Else
               Result = minf.
               Signal Divide by Zero exception.
            Endif
      Endif
   Endif
End.

Procedure Ypx4 (y, x, result)
/* y = -inf, x = norm */
   Parameters:
      y, x  : import floating point number
      result: export floating point number
   Begin
      If x.m - (intpart(x)).m <> 0 Then
         /* x not an integer */
         Result = NAN.
         Signal Invalid Operand exception.
      Else /* x is an integer */
         If even(x) Then
            If x.s = positive Then
               Result = pinf.
            Else
               Result = p0.
            Endif
         Else /* x is odd */
            If x.s = positive Then
               Result = minf.
            Else
               Result = m0.
            Endif
         Endif
      Endif
   End.
```

Figure B-47: Argument Reduction for Ln(1+x)

LOGNP1(X) = {

D2                      IFF  X = -1

```
OPERAND ERROR   IFF   X < -1

LOGN(X + 1)     IFF  -1.0 <  X <= -0.5

LOGNP1(X)       IFF  -0.5 <  X <   1.0

LOGN(X + 1)     IFF   1.0 <= X <  +INF

}
```

Figure B-48: Ln(1+x) Pseudo Code

```
Procedure Lognp1 (arg, result)
   Parameters:
      arg       : import floating point number
      result    : export floating point number
   Storage:
      oneplusarg : floating point number
      one        : floating point constant
   Begin
      CMP (abs(arg), one, relationship).
      Case relationship of
         Greater than:
            If arg.sm = negative Then
               OPERAND ERROR.
               Exit procedure.
            Endif
         Equal:
            If arg.sm = negative Then
               DZ  /* signal divide by zero (see divide routine)*/
               Exit procedure.
            Endif
         Less than:
            If arg.sm <> negative or arg.e <> -1 Then
               Mode4 (arg, result).
               VALID (result, result).
               Exit procedure.
            Endif
      Endcase
      ADD (one, arg, oneplusarg).
      Logn (oneplusarg, result).
      VALID (result, result).
   End.
```

Figure B-49: Argument Reduction for Logn(x)

```
LOGN(X) = {

OPERAND ERROR                        IFF X < 0

DZ                                   IFF X = 0

-LOG[1 + (1-M)/M] + E * LN 2         IFF 0 < X <= 1.0 OR X <= 2.0

LOGNP1(1-X)                          IFF 1 < X < 2.0 where X = M * 2 ** E,            0.5 <= M < 1.0
```

Figure B-50: Logn(x) Pseudo Code

```
Procedure Logn (arg, result)
    Parameters:
        arg     : import positive floating point number
        result  : export floating point number
    Storage:
        e       : floating point number
        m       : floating point number
        ln2     : floating point constant
        zero    : floating point constant
        one     : floating point constant
        two     : floating point constant
    Begin
        CMP (arg, two, relationship).
        Case relationship of
            Greater than:
            Equal:
                Lognmain( arg, result).
            Less than:
                SUB (arg, one, argmone).
                CMP (argmone, zero, relationship).
                If relationship = Greater than Then
                    Lognp1( argmone, result).
                Else
                    Lognmain( arg, result).
                Endif
        Endcase
    End.
```

Figure B-51: Lognmain(x) Pseudo Code

```
Procedure Lognmain (arg, result)
    Parameters:
        arg     : import positive floating point number
        result  : export floating point number
    Storage:
        e       : floating point number
        m       : floating point number
        ln2     : floating point constant Begin
        Arg.e = arg.e + 1.   /* this occurs with unnorming of M */
        M.m = arg.m.         M.e = 0.         M.s = positive.
        Mode4 (m, result).
        If arg.e <> 0 Then  /* the add can be performed safely */
            ROUNDext (result, result).
            FLOAT (arg.e, wordsize, e).
            MUL (e, ln2, e).
            ROUNDext (e).
            ADD (e, result, result).
        Endif
        VALID (result, result).
    End.
```

Figure B-52: Argument Reduction for Log10(x) and Log2(x)

LOG10(X) = LOGN(X) * LOG[BASE 10](E)

LOG2(X)  = LOGN(X) * LOG[BASE 2](E)

where E = the natural number (~ 2.718)

Figure B-53: Log10(x) and Log2(x) Pseudo Code

```
Procedure Log10 (arg, result)
    Parameters:
        arg     : import floating point number
        result  : export floating point number
    Storage:
        log10e  : floating point constant
    Begin
        Logn (arg, result).
        If result <> 0 Then
            ROUNDext (result, result).
            MUL (result, log10e, result).
            VALID (result, result).
        Endif
    End.

Procedure Log2 (arg, result)
    Parameters:
        arg     : import floating point number
        result  : export floating point number
    Storage:
        log2e   : floating point constant
    Begin
        Logn (arg, result).
        If result <> 0 Then
            ROUNDext (result, result).
            MUL (result, log2e, result).
            VALID (result, result).
        Endif
    End.
```

Figure B-54: Argument Reduction for Sinh(x) and Cosh(x)

$$COSH(-X) = COSH(X)$$

$$SINH(-X) = -SINH(X)$$

$$TANH(-X) = -TANH(X)$$

$$COSH(|X|) = 1/2 \ (ETOX(|X|) + ETOX(-|X|))$$

$$SINH(|X|) = 1/2 \ (ETOXM1(|X|) + ETOXM1(|X|)/(1 + ETOXM1(|X|)))$$

$$TANH(|X|) = -ETOXM1(-2*|X|)/(2 + (ETOXM1(-2*|X|))$$

Figure B-55: Sinh(x) Pseudo Code

```
Procedure Sinh (arg, result)

Parameters:
        arg     : import floating point number
        result  : export floating point number
```

```
Storage:
    temp1   : floating point number
    exm1    : floating point number
    one     : floating point constant
Begin
    Etoxm1 (abs(arg), exm1).
    ADD (exm1, one, temp1).
    DIV (exm1, temp1, temp1).
    ADD (exm1, temp1, temp1).
    Result.e = result.e - 1.
    Result.s = arg.s.
    VALID (result, result).
End.
```

Figure B-56: Cosh(x) Pseudo Code

```
Procedure Cosh (arg, result)

Parameters:
        arg     : import floating point number
        result  : export floating point number
    Storage:
        one     : floating point constant
        expx    : floating point number
        temp1   : floating point number Begin
        Etox (abs(arg), expx).
        DIV (one, expx, temp1).
        ADD (expx, temp1, result).
        Result.e = result.e - 1.
        VALID (result, result).
    End.
```

Figure B-57: Tanh(x) Pseudo Code

```
Procedure Tanh (arg, result)

Parameters:
        arg     : import floating point number
        result  : export floating point number
    Storage:
        one     : floating point constant
        two     : floating point number
        exm1    : floating point number
        temp1   : floating point number Begin
        Two = one.
        Two.e = two.e + 1.
        /* temmp1 = - 2 * abs(arg)  */
        Temp1.m = arg.m.
        Temp1.e = arg.e + 1.
        Temp1.s = arg.s.
        Etoxm1 (temp1, temp1).
        ADD (two, temp1, result).
```

```
    DIV (temp1, result, result).
    Result.s = arg.s.
    VALID (result, result).
End.
```

Figure B-58: Argument Reduction for Atanh(x)

$$ATANH(-X) = - ATANH(|X|)$$

$$ATANH(|X|) = 1/2 \ LOGN \ [ \ (1 + |X|)/(1 - |X|) \ ]$$

$$= 1/2 \ LOGNP1 \ [-1 + (1 + |X|)/(1 - |X|)]$$

$$= 1/2 \ LOGNP1 \ [(-1 + |X| + 1 + |X|)/(1 - |X|)]$$

$$= 1/2 \ LOGNP1 \ [ \ 2|X|/(1 - |X|) \ ]$$

Figure B-59: Atanh(x) Pseudo Code

```
Procedure Atanh (arg, result)

Parameters:
        arg     : import floating point number
        result  : export floating point number
    Storage:
        relationship: set of (greater than, equal, less than)
        one          : floating point constant
        temp1        : floating point number
        absx         : floating point number
        twox         : floating point number Begin
        CMP (abs(arg), one, relationship).
        Case relationship of
            Greater than:
                OPERAND ERROR.
            Equal:
                DZ  /* signal divide by zero (see divide routine)*/
            Less than:
                SUB (one, abs(arg), temp1).
                Arg.e = arg.e + 1.
                DIV (abs(arg), temp1, result).
                Lognp1 (result, result).
                Result.e = result.e - 1.
                Result.s = arg.s.
                VALID (result, result).
        Endcase
    End.
```

C. APPENDIX - Tables of Constants

CORDIC Angle Constants

The table of constants below are the angle constants used for mode 1 and mode 2 approximators. Notice, that as an IEEE mantissa, the constants are unnormalized by one bit. The constants are all 66 bits in length - expressed in hexadecimal notation. The exponents are implicit, and need not be stored.

Table C-1: CORDIC Angle Constants

```
atan(2**-00) = 1 921F B544 42D1 8469   implied exponent = 2**00
atan(2**-01) = 1 DAC6 7056 1BB4 F68A   implied exponent = 2**01
atan(2**-02) = 1 F5B7 5F92 C80D D62A   implied exponent = 2**02
atan(2**-03) = 1 FD5B A9AA C2F6 DC65   implied exponent = 2**03
atan(2**-04) = 1 FF55 BB72 CFDE 9C6D   implied exponent = 2**04
atan(2**-05) = 1 FFD5 5BBA 9762 4A84   implied exponent = 2**05
atan(2**-06) = 1 FFF5 55BB B729 AB77   implied exponent = 2**06
atan(2**-07) = 1 FFFD 555B BBA9 72D0   implied exponent = 2**07
atan(2**-08) = 1 FFFF 5555 BBBB 7297   implied exponent = 2**08
atan(2**-09) = 1 FFFF D555 5BBB BA97   implied exponent = 2**09
atan(2**-10) = 1 FFFF F555 55BB BBB7   implied exponent = 2**10
atan(2**-11) = 1 FFFF FD55 555B BBBB   implied exponent = 2**11
atan(2**-12) = 1 FFFF FF55 5555 BBBB   implied exponent = 2**12
atan(2**-13) = 1 FFFF FFD5 5555 5BBB   implied exponent = 2**13
atan(2**-14) = 1 FFFF FFF5 5555 55BB   implied exponent = 2**14
atan(2**-15) = 1 FFFF FFFD 5555 555B   implied exponent = 2**15
atan(2**-16) = 1 FFFF FFFF 5555 5555   implied exponent = 2**16
atan(2**-17) = 1 FFFF FFFF D555 5555   implied exponent = 2**17
atan(2**-18) = 1 FFFF FFFF F555 5555   implied exponent = 2**18
atan(2**-19) = 1 FFFF FFFF FD55 5555   implied exponent = 2**19
atan(2**-20) = 1 FFFF FFFF FF55 5555   implied exponent = 2**20
atan(2**-21) = 1 FFFF FFFF FFD5 5555   implied exponent = 2**21
atan(2**-22) = 1 FFFF FFFF FFF5 5555   implied exponent = 2**22
atan(2**-23) = 1 FFFF FFFF FFFD 5555   implied exponent = 2**23
atan(2**-24) = 1 FFFF FFFF FFFF 5555   implied exponent = 2**24
atan(2**-25) = 1 FFFF FFFF FFFF D555   implied exponent = 2**25
atan(2**-26) = 1 FFFF FFFF FFFF F555   implied exponent = 2**26
atan(2**-27) = 1 FFFF FFFF FFFF FD55   implied exponent = 2**27
atan(2**-28) = 1 FFFF FFFF FFFF FF55   implied exponent = 2**28
atan(2**-29) = 1 FFFF FFFF FFFF FFD5   implied exponent = 2**29
atan(2**-30) = 1 FFFF FFFF FFFF FFF5   implied exponent = 2**30
atan(2**-31) = 1 FFFF FFFF FFFF FFFD   implied exponent = 2**31
```

CORDIC K Inverse Constants

The table of constants below are the inverse error constants used by the mode 1 approximator. Notice, that as an IEEE mantissa, the constants are unnormalized by one bit. All of these constants have an implied exponent of 2**0, since they are the initial value for the X quantity of the approximator. The constants are all 66 bits in length - expressed in hexadecimal notation. In the notation K(i), 'i' indicates the starting shift sequence number (i.e. the absolute value of the argument's exponent).

Table C-2: CORDIC K Inverse Constants

```
K(00) = 1 36E9 DB50 86BC B4CF
K(01) = 1 B7B2 B62C EF82 6DD6
K(02) = 1 EB98 EFFD 6A1D A692
K(03) = 1 FABA 1D91 C304 332E
K(04) = 1 FEAB A42F FF5F EF14
K(05) = 1 FFAA BA4C 79AF 19F7
K(06) = 1 FFEA ABA4 EDA0 6C4D
K(07) = 1 FFFA AABA 4F72 3B60
K(08) = 1 FFFE AAAB A4F9 84A7
K(09) = 1 FFFF AAAA BA4F A1CE
K(10) = 1 FFFF EAAA ABA4 FA42
K(11) = 1 FFFF FAAA AABA 4FA4
K(12) = 1 FFFF FEAA AAAB A4FA
K(13) = 1 FFFF FFAA AAAA BA4F
K(14) = 1 FFFF FFEA AAAA ABA4
K(15) = 1 FFFF FFFA AAAA AABA
K(16) = 1 FFFF FFFE AAAA AAAB
K(17) = 1 FFFF FFFF AAAA AAAA
K(18) = 1 FFFF FFFF EAAA AAAA
K(19) = 1 FFFF FFFF FAAA AAAA
K(20) = 1 FFFF FFFF FEAA AAAA
K(21) = 1 FFFF FFFF FFAA AAAA
K(22) = 1 FFFF FFFF FFEA AAAA
K(23) = 1 FFFF FFFF FFFA AAAA
K(24) = 1 FFFF FFFF FFFE AAAA
K(25) = 1 FFFF FFFF FFFF AAAA
K(26) = 1 FFFF FFFF FFFF EAAA
K(27) = 1 FFFF FFFF FFFF FAAA
K(28) = 1 FFFF FFFF FFFF FEAA
K(29) = 1 FFFF FFFF FFFF FFAA
K(30) = 1 FFFF FFFF FFFF FFEA
K(31) = 1 FFFF FFFF FFFF FFFA
```

Hybrid Meggitt Method Logarithm Constants

The table of constants below are the angle constants used for mode 3 and mode 4 approximators. Notice, that as an IEEE mantissa, the constants are unnormalized by one bit. The constants are all 66 bits in length - expressed in hexadecimal notation. The exponents are implicit, and need not be stored.

Table C-3: Hybrid Meggitt Method Logarithm Constants

```
ln(1+2**-00) = 1 62E4 2FEF A39E F357  implied exponent = 2**00
ln(1+2**-01) = 1 9F32 3ECB F984 BF2B  implied exponent = 2**01
ln(1+2**-02) = 1 C8FF 7C79 A9A2 1AC2  implied exponent = 2**02
ln(1+2**-03) = 1 E270 76E2 AF2E 5E9E  implied exponent = 2**03
ln(1+2**-04) = 1 F0A3 0C01 162A 6617  implied exponent = 2**04
ln(1+2**-05) = 1 F829 B0E7 8330 04CF  implied exponent = 2**05
ln(1+2**-06) = 1 FC0A 8B0F C03E 3CF9  implied exponent = 2**06
ln(1+2**-07) = 1 FE02 A6B1 0678 8FC3  implied exponent = 2**07
ln(1+2**-08) = 1 FF00 AA2B 10BC 04A0  implied exponent = 2**08
ln(1+2**-09) = 1 FF80 2A9A B10E 678A  implied exponent = 2**09
ln(1+2**-10) = 1 FFC0 0AA8 AB10 FBC0  implied exponent = 2**10
```

```
ln(1+2**-11) = 1 FFE0 02AA 6AB1 1066    implied exponent = 2**11
ln(1+2**-12) = 1 FFF0 00AA A2AB 110B    implied exponent = 2**12
ln(1+2**-13) = 1 FFF8 002A A9AA B110    implied exponent = 2**13
ln(1+2**-14) = 1 FFFC 000A AA8A AB11    implied exponent = 2**14
ln(1+2**-15) = 1 FFFE 0002 AAA6 AA81    implied exponent = 2**15
ln(1+2**-16) = 1 FFFF 0000 AAAA 2AAB    implied exponent = 2**16
ln(1+2**-17) = 1 FFFF 8000 2AAA 9AAA    implied exponent = 2**17
ln(1+2**-18) = 1 FFFF C000 0AAA A8AA    implied exponent = 2**18
ln(1+2**-19) = 1 FFFF E000 02AA AA6A    implied exponent = 2**19
ln(1+2**-20) = 1 FFFF F000 00AA AAA2    implied exponent = 2**20
ln(1+2**-21) = 1 FFFF F800 002A AAA9    implied exponent = 2**21
ln(1+2**-22) = 1 FFFF FC00 000A AAAA    implied exponent = 2**22
ln(1+2**-23) = 1 FFFF FE00 0002 AAAA    implied exponent = 2**23
ln(1+2**-24) = 1 FFFF FF00 0000 AAAA    implied exponent = 2**24
ln(1+2**-25) = 1 FFFF FF80 0000 2AAA    implied exponent = 2**25
ln(1+2**-26) = 1 FFFF FFC0 0000 0AAA    implied exponent = 2**26
ln(1+2**-27) = 1 FFFF FFE0 0000 02AA    implied exponent = 2**27
ln(1+2**-28) = 1 FFFF FFF0 0000 00AA    implied exponent = 2**28
ln(1+2**-29) = 1 FFFF FFF8 0000 002A    implied exponent = 2**29
ln(1+2**-30) = 1 FFFF FFFC 0000 000A    implied exponent = 2**30
ln(1+2**-31) = 1 FFFF FFFE 0000 0002    implied exponent = 2**31
ln(1+2**-32) = 1 FFFF FFFF 0000 0000    implied exponent = 2**32
ln(1+2**-33) = 1 FFFF FFFF 8000 0000    implied exponent = 2**33
ln(1+2**-34) = 1 FFFF FFFF C000 0000    implied exponent = 2**34
ln(1+2**-35) = 1 FFFF FFFF E000 0000    implied exponent = 2**35
ln(1+2**-36) = 1 FFFF FFFF F000 0000    implied exponent = 2**36
ln(1+2**-37) = 1 FFFF FFFF F800 0000    implied exponent = 2**37
ln(1+2**-38) = 1 FFFF FFFF FC00 0000    implied exponent = 2**38
ln(1+2**-39) = 1 FFFF FFFF FE00 0000    implied exponent = 2**39
ln(1+2**-40) = 1 FFFF FFFF FF00 0000    implied exponent = 2**40
ln(1+2**-41) = 1 FFFF FFFF FF80 0000    implied exponent = 2**41
ln(1+2**-42) = 1 FFFF FFFF FFC0 0000    implied exponent = 2**42
ln(1+2**-43) = 1 FFFF FFFF FFE0 0000    implied exponent = 2**43
ln(1+2**-44) = 1 FFFF FFFF FFF0 0000    implied exponent = 2**44
ln(1+2**-45) = 1 FFFF FFFF FFF8 0000    implied exponent = 2**45
ln(1+2**-46) = 1 FFFF FFFF FFFC 0000    implied exponent = 2**46
ln(1+2**-47) = 1 FFFF FFFF FFFE 0000    implied exponent = 2**47
ln(1+2**-48) = 1 FFFF FFFF FFFF 0000    implied exponent = 2**48
ln(1+2**-49) = 1 FFFF FFFF FFFF 8000    implied exponent = 2**49
ln(1+2**-50) = 1 FFFF FFFF FFFF C000    implied exponent = 2**50
ln(1+2**-51) = 1 FFFF FFFF FFFF E000    implied exponent = 2**51
ln(1+2**-52) = 1 FFFF FFFF FFFF F000    implied exponent = 2**52
ln(1+2**-53) = 1 FFFF FFFF FFFF F800    implied exponent = 2**53
ln(1+2**-54) = 1 FFFF FFFF FFFF FC00    implied exponent = 2**54
ln(1+2**-55) = 1 FFFF FFFF FFFF FE00    implied exponent = 2**55
ln(1+2**-56) = 1 FFFF FFFF FFFF FF00    implied exponent = 2**56
ln(1+2**-57) = 1 FFFF FFFF FFFF FF80    implied exponent = 2**57
ln(1+2**-58) = 1 FFFF FFFF FFFF FFC0    implied exponent = 2**58
ln(1+2**-59) = 1 FFFF FFFF FFFF FFE0    implied exponent = 2**59
ln(1+2**-60) = 1 FFFF FFFF FFFF FFF0    implied exponent = 2**60
ln(1+2**-61) = 1 FFFF FFFF FFFF FFF8    implied exponent = 2**61
ln(1+2**-62) = 1 FFFF FFFF FFFF FFFC    implied exponent = 2**62
ln(1+2**-63) = 1 FFFF FFFF FFFF FFFE    implied exponent = 2**63
```

Reduction Identity Constants

The following constants are floating point constants used in the argument reduction identities given in this document. All of the signs of the mantissas are positive, thus, they are not stored in the ROM area. All mantissas are 66 bits in length, expressed in hexadecimal notation. All exponents are 17 bits in length, left justified in a 66 bit field (i.e. as they would be mapped onto internal buses), and expressed in hexadecimal notation.

Table C-4: Reduction Identity Constants

| constant | mantissa | exponent |
|---|---|---|
| ln2      | 2 C5C8 5FDF 473D E6AF | 7 FFFC 0000 0000 0000 |
| ln10     | 2 4D76 3776 AAA2 B05B | 0 0004 0000 0000 0000 |
| log10of2 | 2 6882 6A13 EF3F DE62 | 7 FFF8 0000 0000 0000 |
| log10ofe | 3 796F 62A4 DCA1 C654 | 7 FFF8 0000 0000 0000 |
| log2ofe  | 2 E2A8 ECA5 705F C2EE | 0 0000 0000 0000 0000 |
| one      | 2 0000 0000 0000 0000 | 0 0000 0000 0000 0000 |
| pi       | 3 243F 6A88 85A3 08D3 | 0 0004 0000 0000 0000 |

We claim:
1. An execution unit comprising:
a first data bus (ABUS);
a second data bus (BBUS);
a third data bus (CBUS);
a fourth data bus (AIN);
a fifth data bus (BIN);
a sixth data bus (SBUS);
a first switch for selectively coupling the first and second buses;
a second switch for selectively coupling the first and fourth buses;
sign logic coupled to the sixth bus and adapted to selectively latch a first operand sign and a second operand sign, and to provide a sign signal via the sixth bus indicative of the first operand sign, the second operand sign or the EXCLUSIVE OR of the first operand sign and the second operand sign;
a left shift temporary register adapted to be selectively coupled to the first bus;
a right shift temporary register adapted to be selectively coupled to the second bus;
a barrel shifter coupled between the left and right shift temporary registers;
a barrel shifter decoder coupled to the barrel shifter and adapted to be selectively coupled to the third bus and to control shifts by the barrel shifter between the left and right shift temporary registers in response to shift counts received on the third bus;
a first working register (ATEMP) adapted to be selectively coupled to the second and fifth buses;
a second working register (SL1B) adapted to be selectively coupled to the second and fourth buses;
a third working register (SR2B) adapted to be selectively coupled to the second bus;
a fourth working register (ACONST) adapted to be selectively coupled to the third bus and to a predetermined portion of the fourth bus;
leading zero detect (LZD) logic coupled to a predetermined high order portion of the third working register and adapted to be selectively coupled to the third bus, to detect the number of leading zeros in the high order portion of the third working register and to selectively provide a shift count indicative thereof to the barrel shifter decoder via the third bus;
a multiplexor (MUX) coupled to the first working register and to the second and fifth buses and adapted to selectively couple the fifth bus to either the second bus or to the first working register;
an adder unit (AU) having a first input port (AUA) coupled to the fourth bus and adapted to selectively complement an input received via the fourth bus, a second input port (AUB) coupled to the fifth bus, and an output port coupled to the second bus, the adder unit being adapted to receive a carry in (CIN) signal and to provide a carry out (COUT) signal;
a first counter (FCNTR) adapted to be selectively coupled to a first portion of the second bus and to the third bus;
a second counter (KCNTR) adapted to be selectively coupled to a second portion of the second bus and to the third bus;
sticky (STICKY) logic adapted to receive the carry out signal from the adder unit and to provide a sticky signal; and
round (ROUND) logic coupled to a predetermined low order portion of the first working register, to the sticky logic and to the sixth bus, and adapted to receive the sign signal from the sign logic via the sixth bus, the low order portion of the first working register and the sticky signal from the sticky logic, and to provide the carry in signal to the adder unit in response to selected logical combinations of the low order portion of the first working register, the sticky signal and the sign signal.

2. The execution unit of claim 1 further comprising:
scan (SCAN) logic coupled to a low order portion of the third working register, to the third bus and to the first input port of the adder unit, for selectively providing a shift count to the barrel shifter decoder via the third bus and complementing control signal to the first input port of the adder unit in response to selected logical combinations of the low order portion of the third working register; and
wherein the sticky logic is adapted to be selectively coupled to the second bus; wherein the third working register is adapted to selectively shift right logical two (2) bits; and wherein the multiplexor includes shift (SHIFT) logic adapted to selectively shift right arithmetic two (2) bits.

3. The execution unit of claim 2 wherein the first working register is adapted to be selectively coupled to the fifth bus; wherein the second working register is adapted to selectively receive the carry out signal of the adder unit and to selectively shift left logical one (1) bit; and wherein the shift logic of the multiplexor is adapted to selectively shift left logical one (1) bit.

4. The execution unit of claim 3 wherein the third working register is adapted to selectively shift left logical two (2) bits; and wherein the shift logic of the multiplexor is adapted to selectively shift left logical two (2) bits.

5. The execution unit of claim 4 further comprising:
a memory (CONSTANT ROM) coupled to the third bus and adapted to be selectively coupled to the second bus, for storing selected constants and selectively providing a predetermined one of the stored constants via the second bus in response to receiving a respective address via the third bus; and
a third counter (JCNTR) adapted to be selectively coupled to a third portion of the second bus and to the third bus.

6. The execution unit of claim 5 further comprising:
a comparator (FPLA) coupled to the first counter and adapted to detect predetermined logical patterns in the first counter and to provide a detect signal indicative of the detected pattern.

* * * * *

UNITED STATES PATENT AND TRADEMARK OFFICE
CERTIFICATE OF CORRECTION

PATENT NO. : 4,777,613

DATED : October 11, 1988

INVENTOR(S) : Van B. Shahan et al

It is certified that error appears in the above-identified patent and that said Letters Patent is hereby corrected as shown below:

On the cover page, category [75], please add the following inventors:

Kirk Holden, Austin, Tex and Stanley Groves, Round Rock, Tex.

Signed and Sealed this

Twenty-eighth Day of February, 1989

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,777,613

DATED : October 11, 1988

INVENTOR(S) : Van B. Shahan, et al

It is certified that error appears in the above-identified patent and that said Letters Patent is hereby corrected as shown below:

On the title page, item [75] "Ashok H. Someshway" should read
--Ashok H. Someshwar--.

Signed and Sealed this

Second Day of May, 1989

Attest:

DONALD J. QUIGG

Attesting Officer

Commissioner of Patents and Trademarks